(12) United States Patent
Ichihara

(10) Patent No.: US 8,589,797 B2
(45) Date of Patent: Nov. 19, 2013

(54) IMAGE FORMING APPARATUS, OPERATION-SCREEN CHANGING METHOD, AND COMPUTER-READABLE RECORDING MEDIUM

(75) Inventor: Masahiro Ichihara, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 493 days.

(21) Appl. No.: 12/389,617

(22) Filed: Feb. 20, 2009

(65) Prior Publication Data

US 2009/0235173 A1    Sep. 17, 2009

(30) Foreign Application Priority Data

Mar. 17, 2008   (JP) ................................. 2008-068203
Jun. 27, 2008   (JP) ................................. 2008-168559

(51) Int. Cl.
*G06F 3/0484* (2013.01)
(52) U.S. Cl.
USPC ........... 715/733; 715/762; 715/744; 715/769; 715/747; 717/120; 358/1.15
(58) Field of Classification Search
USPC ....................................................... 715/733
See application file for complete search history.

(56) References Cited

U.S. PATENT DOCUMENTS

| | | | |
|---|---|---|---|
| 6,411,311 B1 * | 6/2002 | Rich et al. ...................... | 715/769 |
| 6,667,816 B1 * | 12/2003 | Van Buren et al. ........... | 358/3.13 |
| 6,674,537 B2 * | 1/2004 | Kadowaki ..................... | 358/1.15 |
| 7,395,533 B2 * | 7/2008 | Suzuki .......................... | 717/174 |
| 7,624,350 B2 * | 11/2009 | Garg et al. ..................... | 715/762 |
| 7,826,078 B2 * | 11/2010 | Okamoto et al. ............. | 358/1.15 |
| 7,830,534 B2 * | 11/2010 | Tomita .......................... | 358/1.13 |
| 7,843,578 B2 * | 11/2010 | Nonaka et al. ................ | 358/1.13 |
| 2003/0023641 A1 * | 1/2003 | Gorman et al. ................ | 707/530 |
| 2004/0061907 A1 * | 4/2004 | Nakaota ......................... | 358/474 |
| 2004/0230905 A1 * | 11/2004 | Asakawa et al. .............. | 715/517 |

(Continued)

FOREIGN PATENT DOCUMENTS

| | | |
|---|---|---|
| CN | 101064713 A | 10/2007 |
| CN | 101098384 A | 1/2008 |

(Continued)

OTHER PUBLICATIONS

Office Action issued Sep. 20, 2010 in Chinese Application No. 2009101289111 (With English Translation).

(Continued)

*Primary Examiner* — William Bashore
*Assistant Examiner* — Reza Nabi
(74) *Attorney, Agent, or Firm* — Oblon, Spivak, McClelland, Maier & Neustadt, L.L.P.

(57) ABSTRACT

In an image forming apparatus, a plurality of sets of flow definition data and screen definition data are stored in associated manner in a storage unit. A client device selects one of the sets of the flow definition data. Screen definition data corresponding to a process defined by the selected flow definition data is acquired from the storage unit and an editing screen is created from this screen definition data. The editing screen is sent to the client device and a predetermined operation with respect to a component of the editing screen is received from the client device. Screen definition data is created based on the changed editing screen in accordance with the predetermined operation, and the new screen definition data is stored in the storage unit so as to be associated with the flow definition data.

17 Claims, 34 Drawing Sheets

(56) References Cited

U.S. PATENT DOCUMENTS

| | | | |
|---|---|---|---|
| 2005/0102632 A1* | 5/2005 | Klinger et al. | 715/789 |
| 2005/0105129 A1* | 5/2005 | Takahashi | 358/1.15 |
| 2005/0152544 A1* | 7/2005 | Kizawa | 380/55 |
| 2005/0185217 A1* | 8/2005 | Nishizawa et al. | 358/1.15 |
| 2005/0260009 A1* | 11/2005 | Namizuka et al. | 399/80 |
| 2005/0265744 A1* | 12/2005 | Uruta | 399/80 |
| 2006/0055968 A1* | 3/2006 | Sato et al. | 358/1.15 |
| 2006/0061819 A1* | 3/2006 | Fujiwara et al. | 358/1.15 |
| 2006/0101343 A1* | 5/2006 | Machida | 715/744 |
| 2006/0232820 A1* | 10/2006 | Kasamatsu | 358/1.16 |
| 2006/0238793 A1* | 10/2006 | Akashi et al. | 358/1.13 |
| 2006/0279780 A1* | 12/2006 | Anno et al. | 358/1.15 |
| 2007/0103714 A1* | 5/2007 | Ushiku | 358/1.14 |
| 2007/0165265 A1* | 7/2007 | Ito et al. | 358/1.15 |
| 2007/0247642 A1 | 10/2007 | Nakamura et al. | |
| 2007/0279666 A1* | 12/2007 | Lee et al. | 358/1.13 |
| 2007/0297017 A1* | 12/2007 | Kashioka | 358/448 |
| 2007/0297022 A1* | 12/2007 | Nakatsuka | 358/474 |
| 2008/0016450 A1* | 1/2008 | Aono | 715/747 |
| 2008/0036779 A1 | 2/2008 | Hozumi | |
| 2008/0316526 A1* | 12/2008 | Matsuzaki et al. | 358/1.15 |
| 2009/0103828 A1* | 4/2009 | Shibukawa et al. | 382/260 |
| 2009/0147301 A1* | 6/2009 | Lee | 358/1.15 |
| 2009/0150865 A1* | 6/2009 | Young et al. | 717/120 |
| 2009/0235173 A1* | 9/2009 | Ichihara | 715/733 |
| 2009/0237692 A1* | 9/2009 | Endoh et al. | 358/1.9 |
| 2009/0316175 A1* | 12/2009 | Wang | 358/1.13 |
| 2010/0088618 A1* | 4/2010 | Mayer-Ullmann | 715/763 |
| 2010/0179983 A1* | 7/2010 | Asakawa et al. | 709/203 |
| 2011/0035704 A1* | 2/2011 | Nishino et al. | 715/810 |
| 2011/0051176 A1* | 3/2011 | Kang et al. | 358/1.15 |
| 2011/0075199 A1* | 3/2011 | Jung et al. | 358/1.15 |
| 2011/0082845 A1* | 4/2011 | Padala et al. | 707/702 |

FOREIGN PATENT DOCUMENTS

| | | |
|---|---|---|
| CN | 101127980 A | 2/2008 |
| EP | 1 852 748 A1 | 11/2007 |
| JP | 1-251216 | 10/1989 |
| JP | 9-16383 | 1/1997 |
| JP | 10-269194 | 10/1998 |
| JP | 11-15522 | 1/1999 |
| JP | 2000-59554 | 2/2000 |
| JP | 2002-281195 | 9/2002 |
| JP | 2003-32425 | 1/2003 |
| JP | 2003-150971 | 5/2003 |
| JP | 2004-112067 | 4/2004 |
| JP | 2005-057617 | 3/2005 |
| JP | 2007-6443 | 1/2007 |
| JP | 2007-172098 | 7/2007 |
| JP | 2008-015836 | 1/2008 |

OTHER PUBLICATIONS

Chinese Office Action issued Mar. 30, 2011, in Patent Application No. 200910128911.1 (with English-language translation).

Japanese Office issued Aug. 14, 2012 in Japanese Application No. 2008-168559 filed Jun. 27, 2008 (without English translation).

Office Action issued on Aug. 28, 2013 in corresponding European Patent Application No. 09153395.0.

* cited by examiner

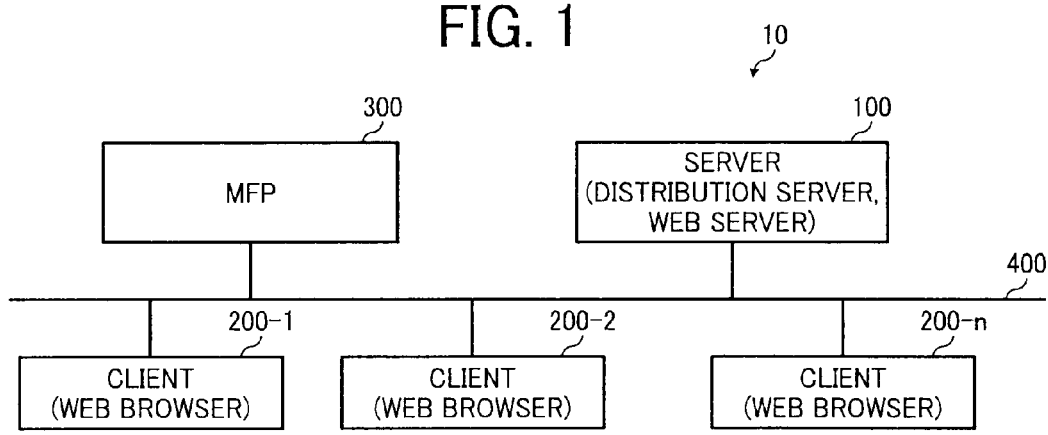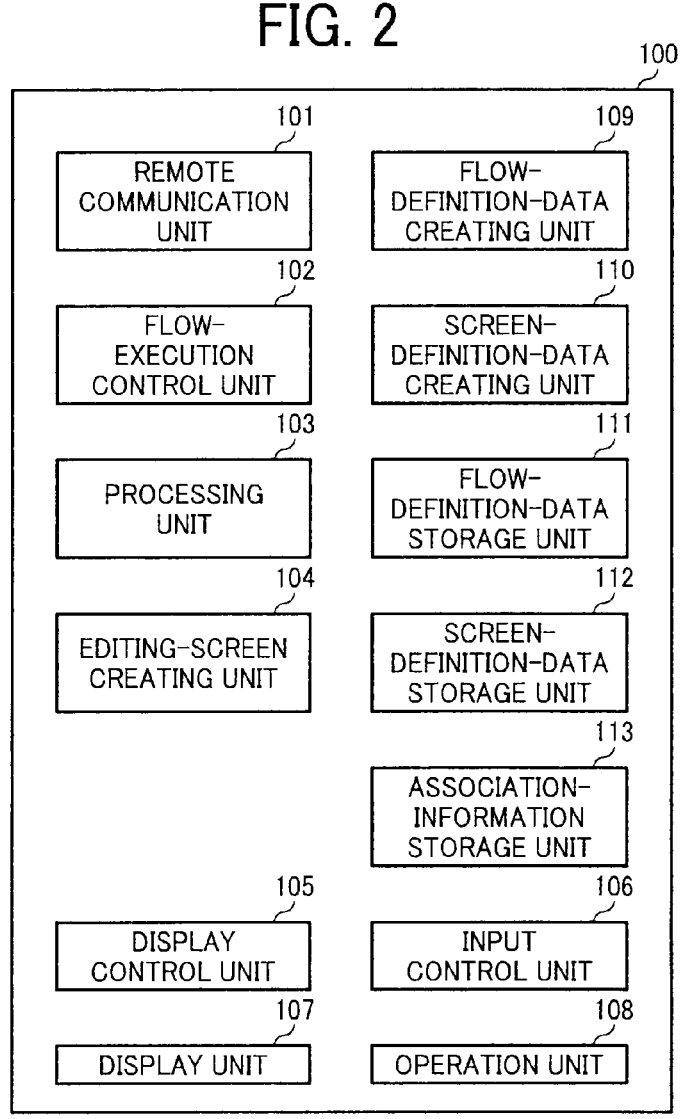

FIG. 3
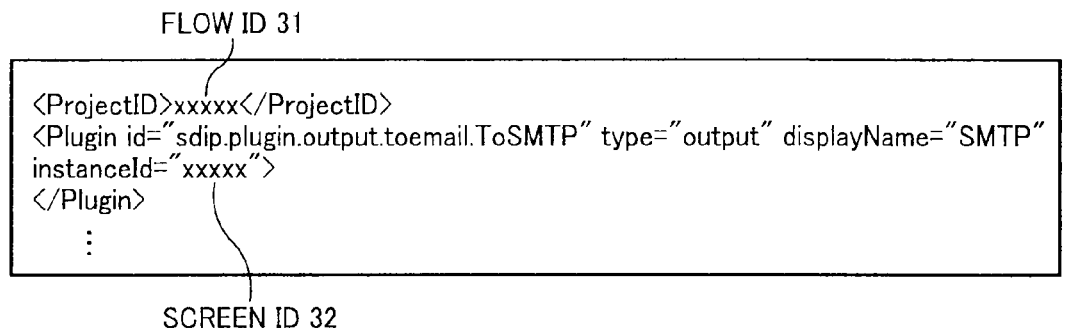
FLOW ID 31
```
<ProjectID>xxxxx</ProjectID>
<Plugin id="sdip.plugin.output.toemail.ToSMTP" type="output" displayName="SMTP"
instanceId="xxxxx">
</Plugin>
    ⋮
```
SCREEN ID 32
FIG. 4
| ProjectID | PluginInstanceID |
|---|---|
| xxxxx | xxxxx |
FIG. 5
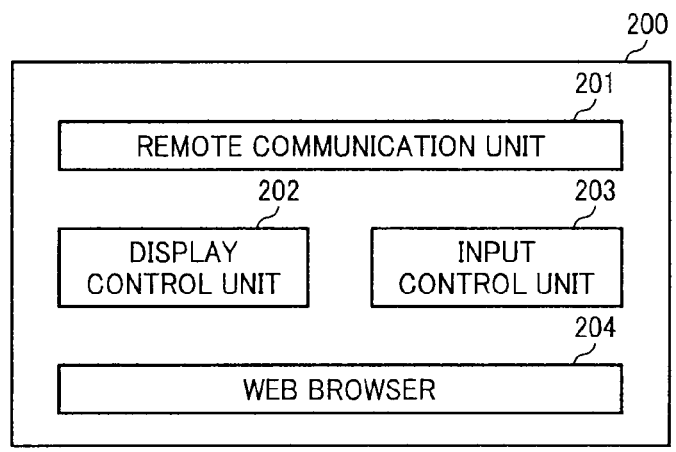

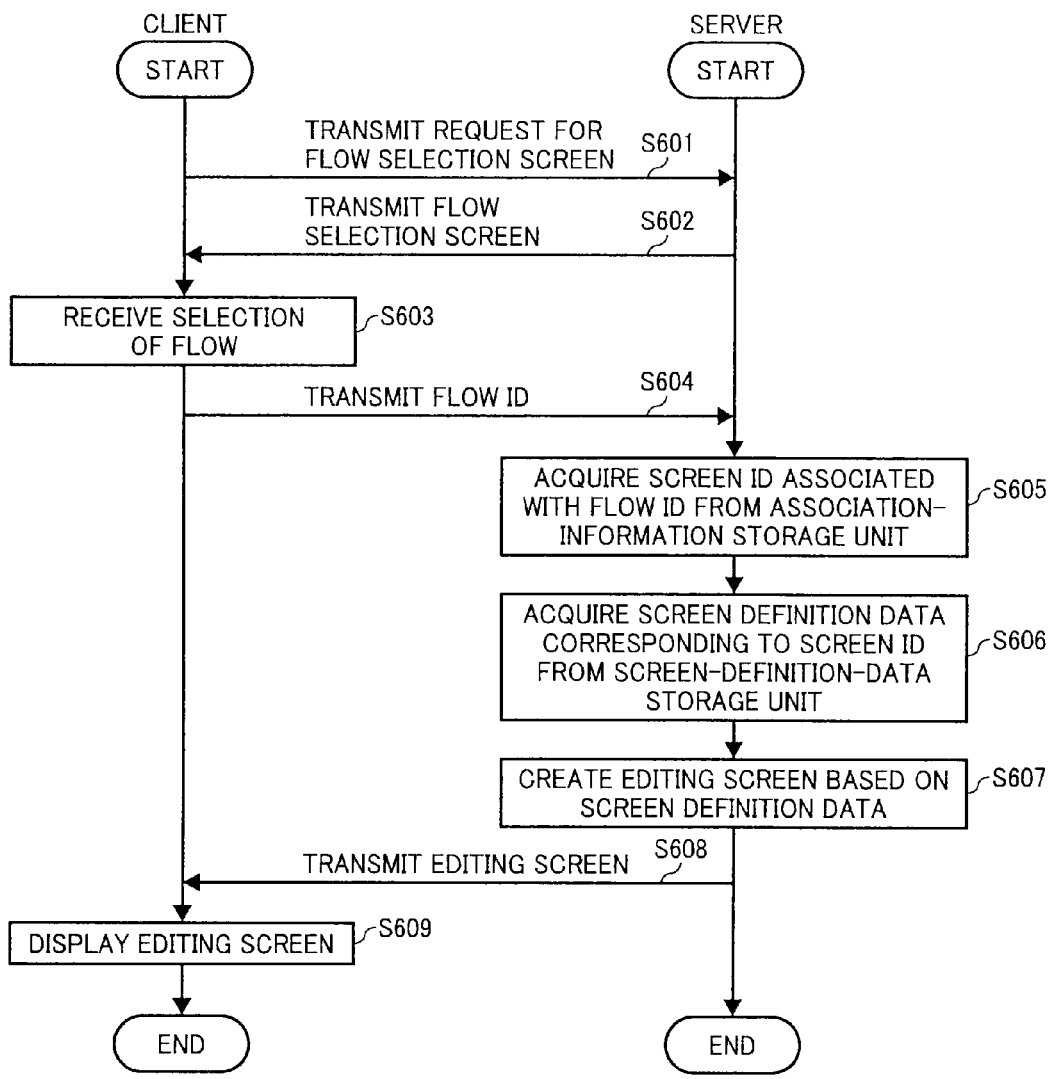

FIG. 8

PLEASE CLICK ON "OK" IF YOU CONFIRM SETTINGS

| SCAN SETTING | xxxx | | | | OK |

| RESOLUTION | ⦿ 100 dpi | ○ 200 dpi | ○ 300 dpi | ○ 400 dpi | ○ 600 dpi |

TYPE OF ORIGINAL: TEXT ▶

FILE FORMAT: PDF_Single ▶

ORIENTATION OF ORIGINAL: BINARY: ⦿ PORTRAIT  ○ LANDSCAPE
MULTIPLE-VALUE:

SIDE(S) OF ORIGINAL TO BE SCANNED: ⦿ ONE SIDE  ○ BOTH SIDES

IMAGE DENSITY: ☑ AUTOMATIC DENSITY  1 ▶

SCANNING MODE: ⦿ ADF/EXPOSURE GLASS  ○ MASS-SCANNING  ○ SADF

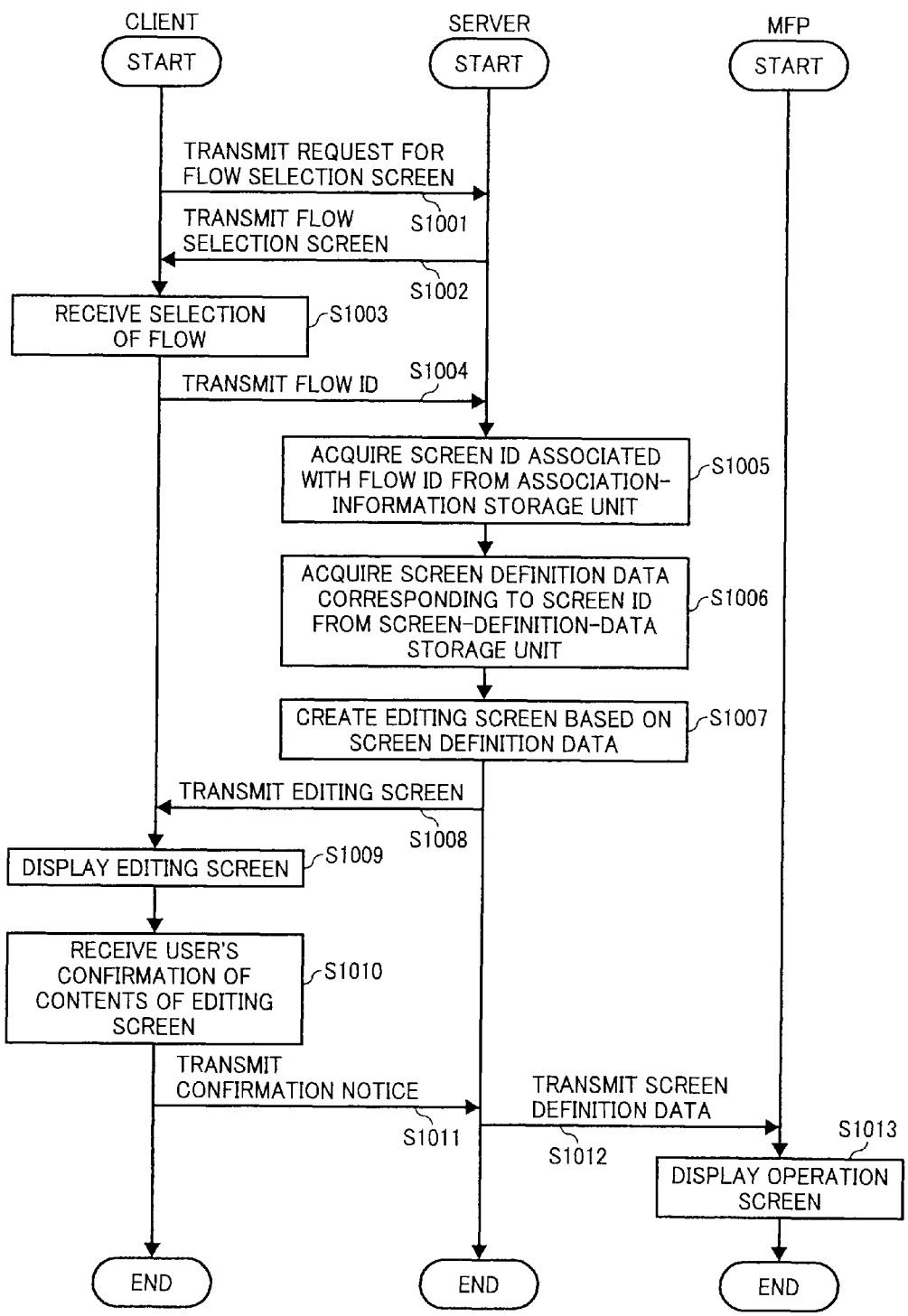

FIG. 11

```
⋮
<OperationPanelScreen screenTitle="Ridoc GlobalScan">
 <GroupWindow id="e62640d4-3901-11dd-b628-b73ccc504098" groupVisible="true"
title="GROUP 1">          50-1                                 ⋮
  <Name>
   <ja_JP>GROUP 1</ja_JP>
  </Name>
  <Window id="page-0">                                                50-3
   <RadioButton id="f3fac006-3901-11dd-b628-b73ccc504098" enabled="true"
visible="true" column="0" row="0" colspan="2" rowspan="4" text="PROJECT A"
selected="true" shape="button" language="ja_JP" required="false"
icon="projectIcon.jpg" iconType="2" shortId="pj_1" isOneAction="false" authProfileId=""
authProfileInstanceId="">
    <Value />              50-5
    <Name>
     <ja_JP>PROJECT A</ja_JP>
    </Name>
   </RadioButton>                                                     50-4
   <RadioButton id="fbea0007-3901-11dd-b628-b73ccc504098" enabled"true"
visible="true" column="2" row="0" colspan="2" rowspan="4" text="PROJECT B"
selected="false" shape="button" language="ja_JP" required="false" icon=""
iconType="0" shortId="pj_2" isOneAction="false" authProfileId=""
authProfileInstanceId="">
    <Value />
    <Name>
     <ja_JP>PROJECT B</ja_JP>
    </Name>
   </RadioButton>
  </Window>
 </GroupWindow>
 <GroupWindow id="eb374015-3901-11dd-b628-b73ccc504098" groupVisible="true"
title="GROUP 2">
  <Name>          50-2
   <ja_JP>GROUP 2</ja_JP>
  </Name>
  <Window id="page-0" />
 </GroupWindow>
</OperationPanelScreen>

```
⋮
<OperationPanelScreen screenTitle="Ridoc GlobalScan">
<GroupWindow id="e62640d4-3901-11dd-b628-b73ccc504098" groupVisible="true" title="GROUP 1">
<Name>
<ja_JP>GROUP 1</ja_JP>
</Name>
<Window id="page-0">
<RadioButton id="f3fac006-3901-11dd-b628-b73ccc504098" enabled="true" visible="true" column="0" row="0" colspan="2" rowspan="4" text="PROJECT A" selected="true" shape="button" language="ja_JP" required="false" icon="projectIcon.jpg" iconType="2" shortId="pj_1" isOneAction="false" authProfileId="" authProfileInstanceId="">
<Value />
<Name>
<ja_JP>PROJECTA</ja_JP>
</Name>
</RadioButton>
<RadioButton id="fbea0007-3901-11dd-b628-b73ccc504098" enabled="true" visible="true" column="2" row="0" colspan="2" rowspan="4" text="PROJECT B" selected="false" shape="button" language="ja_JP" required="false" icon="" iconType="0" shortId="pj_2" isOneAction="false" authProfileId="" authProfileInstanceId="">
<Value />
<Name>
<ja_JP>PROJECT B</ja_JP>
</Name>
</RadioButton>
</Window>
</GroupWindow>
```
51 {
```
<EditBox id="1D3899FA-B429-4458-6285-9036B59C196D" enabled="true" visible="true" required="false" column="0" row="3" colspan="2" rowspan="1" language="ja_JP">
<Text>
<ja_JP>THIS IS SAMPLE PROJECT</ja_JP>
</Text>
</EditBox>
```
```
<GroupWindow id="eb374015-3901-11dd-b628-b73ccc504098" groupVisible="true" title="GROUP 2">
<Name>
<ja_JP>GROUP 2</ja_JP>
</Name>
<Window id="page-0" />
</GroupWindow>
</OperationPanelScreen>
⋮
```

FIG. 18

```
⋮
<OperationPanelScreen screenTitle="Ridoc GlobalScan">
 <GroupWindow id="e62640d4-3901-11dd-b628-b73ccc504098" groupVisible="true"
title="GROUP 1">
 <Name>
  <ja_JP>GROUP 1</ja JP>
 </Name>                                                    52
 <Window id="page-0">                                      /
  <RadioButton id="f3fac006-3901-11dd-b628-b73ccc504098" enabled="true"
visible="true" column"0" row="0" colspan="2" rowspan="3" text="PROJECT A"
selected="true" shape="button" language="ja_JP" required="false"
icon="projectIcon.jpg" iconType="2" shortId="pj_1" isOneAction="false" authProfileId=""
authProfileInstanceId="">
   <Value />
   <Name>
    <ja_JP>PROJECT A</ja_P>
   </Name>
  </RadioButton>
  <RadioButton id="fbea0007-3901-11dd-b628-b73ccc504098" enabled="true"
visible="true" column="2" row="0" colspan="2" rowspan="4" text="PROJECT B"
selected="false" shape="button" language="ja_JP" required="false" icon=""
iconType="0" shortId="pj_2" isOneAction="false" authProfileId=""
authProfileInstanceId="">
   <Value />
   <Name>
    <ja_JP>PROJECT B</ja_JP>
   </Name>
  </RadioButton>
 </Window>
 </GroupWindow>
 <GroupWindow id="eb374015-3901-11dd-b628-b73ccc504098" groupVisible="true"
title="GROUP 2"> .
 <Name>
  <ja_JP>GROUP 2</ja_JP>
 </Name>
 <Window id="page-0" />
 </GroupWindow>
</OperationPanelScreen>
⋮
```

FIG. 21

PLEASE CLICK ON "OK" IF YOU CONFIRM SETTINGS

SCAN SETTING: xxxx

OK

TYPE OF ORIGINAL: TEXT ▶

FILE FORMAT: PDF_Single ▶

MULTIPLE-VALUE: ▶

ORIENTATION OF ORIGINAL: ⊙ PORTRAIT  ○ LANDSCAPE

SIDE(S) OF ORIGINAL TO BE SCANNED: ⊙ ONE SIDE  ○ BOTH SIDES

IMAGE DENSITY: ☑ AUTOMATIC DENSITY  1 ▶

SCANNING MODE: ⊙ ADF/EXPOSURE GLASS  ○ MASS-SCANNING  ○ SADF

RESOLUTION: ⊙ 100 dpi  ○ 200 dpi  ○ 300 dpi  ○ 400 dpi  ○ 600 dpi

33

```
⋮
<Label id="label" enabled="true" visible="true"
column="7" row="0" colspan="1" rowspan="1"
label="RESOLUTION" align="" fontSize=""
foregroundColor="" backgroundColor="">
<ParameterID>label_value</ParameterID>
<Option option="option" />
    ⋮
</Label>
    ⋮
```

FIG. 24

PLEASE CLICK ON "OK" IF YOU CONFIRM SETTINGS | OK

| SCAN SETTING | xxxx |

| TYPE OF ORIGINAL | TEXT ▶ |
| FILE FORMAT | BINARY: PDF_Single ▶ |
| | MULTIPLE-VALUE: ▶ |
| ORIENTATION OF ORIGINAL | ⊙ PORTRAIT  ○ LANDSCAPE |
| SIDE(S) OF ORIGINAL TO BE SCANNED | ⊙ ONE SIDE  ○ BOTH SIDES |
| IMAGE DENSITY | ☑ AUTOMATIC DENSITY   1 ▶ |
| SCANNING MODE | ⊙ ADF/EXPOSURE GLASS  ○ MASS-SCANNING  ○ SADF |

NON-DISPLAY ITEM (PRESET)

| RESOLUTION | ⊙ 100 dpi  ○ 200 dpi  ○ 300 dpi  ○ 400 dpi  ○ 600 dpi |

```
                                                    35
    ⋮
<Label id="label" enabled="true" visible="false"
column="0" row="0" colspan="1" rowspan="1"
label="RESOLUTION" align="" fontSize=""
foregroundColor="" backgroundColor="">
<ParameterID>label_value</ParameterID>
<Option option="option" />
    ⋮
</Label>
    ⋮
```

FIG. 26

PLEASE CLICK ON "OK" IF YOU CONFIRM SETTINGS

SCAN SETTING  xxxx

TYPE OF ORIGINAL: TEXT ▶

FILE FORMAT: PDF_Single ▶

MULTIPLE-VALUE: ▶

BINARY: ▶

ORIENTATION OF ORIGINAL: ◉ PORTRAIT  ○ LANDSCAPE

SIDE(S) OF ORIGINAL TO BE SCANNED: ◉ ONE SIDE  ○ BOTH SIDES

IMAGE DENSITY: ☑ AUTOMATIC DENSITY  1 ▶

SCANNING MODE: ◉ ADF/EXPOSURE GLASS  ○ MASS-SCANNING  ○ SADF

NON-DISPLAY ITEM (PRESET)

MAIN | NON-DISPLAY

PLEASE CLICK ON "OK" IF YOU CONFIRM SETTINGS

| SCAN SETTING | xxxx | | | OK |

TYPE OF ORIGINAL: TEXT ▼

FILE FORMAT: PDF_Single ▼

MULTIPLE-VALUE: ▼

ORIENTATION OF ORIGINAL: ◉ PORTRAIT  ○ LANDSCAPE

SIDE(S) OF ORIGINAL TO BE SCANNED: ◉ ONE SIDE  ○ BOTH SIDES

IMAGE DENSITY: ☑ AUTOMATIC DENSITY  1 ▼

SCANNING MODE: ◉ ADF/EXPOSURE GLASS  ○ MASS-SCANNING  ○ SADF

NON-DISPLAY ITEM (PRESET)

RESOLUTION: ○ 100 dpi  ○ 200 dpi  ◉ 300 dpi  ○ 400 dpi  ○ 600 dpi

PLEASE CLICK ON "OK" IF YOU CONFIRM SETTINGS

SCAN SETTING  xxxx    OK

TYPE OF ORIGINAL: TEXT ▶

FILE FORMAT  BINARY: PDF_Single ▶  MULTIPLE-VALUE: ▶

ORIENTATION OF ORIGINAL: ⊙ PORTRAIT  ○ LANDSCAPE

SIDE(S) OF ORIGINAL TO BE SCANNED: ⊙ ONE SIDE  ○ BOTH SIDES

IMAGE DENSITY: ☑ AUTOMATIC DENSITY   1 ▶

SCANNING MODE: ⊙ ADF/EXPOSURE GLASS  ○ MASS-SCANNING  ○ SADF

HALF-BRIGHT DISPLAY ITEM (PRESET)

RESOLUTION: ○ 100 dpi  ○ 200 dpi  ⊙ 300 dpi  ○ 400 dpi  ○ 600 dpi

```
⋮
<RadioButtonGroup id="radioButtonGroup"
 enabled="true" visible="true" required="true"
 selectedID="radio1">
<ParameterID>radioBtnGroup</ParameterID>
<Option option="option" />
 ⋮
<RadioButton id="radio1" text="100dpi" visible="true">
</RadioButton>                                          ~42
<RadioButton id="radio2" text="200dpi" visible="false">
</RadioButton>
<RadioButton id="radio3" text="300dpi" visible="true">
</RadioButton>
</RadioButtonGroup>
 ⋮
```

FIG. 34

PLEASE CLICK ON "OK" IF YOU CONFIRM SETTINGS

| SCAN SETTING | xxxx | | | OK |

43

| RESOLUTION | ⊙ 100 dpi | ○ 300 dpi | ○ 400 dpi | ○ 600 dpi |

TYPE OF ORIGINAL: TEXT ▶

FILE FORMAT: PDF_Single ▶

MULTIPLE-VALUE: BINARY: ▶

ORIENTATION OF ORIGINAL: ⊙ PORTRAIT   ○ LANDSCAPE

SIDE(S) OF ORIGINAL TO BE SCANNED: ⊙ ONE SIDE   ○ BOTH SIDES

IMAGE DENSITY: ☑ AUTOMATIC DENSITY   1 ▶

SCANNING MODE: ⊙ ADF/EXPOSURE GLASS   ○ MASS-SCANNING   ○ SADF

FIG. 36

PLEASE CLICK ON "OK" IF YOU CONFIRM SETTINGS　　　　　OK

| SCAN SETTING | xxxx |
| TYPE OF ORIGINAL | TEXT ▶ |
| FILE FORMAT | BINARY: PDF_Single ▶　MULTIPLE-VALUE: ▶ |
| ORIENTATION OF ORIGINAL | ⦿ PORTRAIT　○ LANDSCAPE |
| SIDE(S) OF ORIGINAL TO BE SCANNED | ⦿ ONE SIDE　○ BOTH SIDES |
| IMAGE DENSITY | ☑ AUTOMATIC DENSITY　1 ▶ |
| SCANNING MODE | ⦿ ADF/EXPOSURE GLASS　○ MASS-SCANNING　○ SADF |

NON-DISPLAY ITEM (PRESET)

RESOLUTION　⦿ 100 dpi　○ 200 dpi　○ 300 dpi　○ 400 dpi　○ 600 dpi

44

```
⋮
<Label id="label" enabled="false" visible="true"
column="0" row="0" colspan="1" rowspan="1"
label="Resolution" align="" fontSize=""
foregroundColor="" backgroundColor="">
<ParameterID>label_value</ParameterID>
<Option option="option" />
    ⋮
</Label>
    ⋮
```
45

FIG. 41

```
                    ⋮
<RadioButtonGroup id="radioButtonGroup"
enabled="true" visible="true" required="true"
selectedID="radio1">
<ParameterID>radioBtnGroup</ParameterID>
<Option option="option" />
<Action id="onInit">
<UIEvent/>
<GetUI/>
<ChangeAttribute/>
<SendEvent/>
<MessageBox/>
</Action>
<Action id="onSelect">
<UIEvent/>
<GetUI/>
<ChangeAttribute/>
<SendEvent/>
<MessageBox/>
</Action>
<RadioButton id="radio1" text="100dpi" enable="true">
</RadioButton>                                          ~48
<RadioButton id="radio2" text="200dpi" enable ="false">
</RadioButton>
<RadioButton id="radio3" text="300dpi" enable="true">
</RadioButton>
</RadioButtonGroup>
```

FIG. 42

| PLEASE CLICK ON "OK" IF YOU CONFIRM SETTINGS | | | | OK |

| SCAN SETTING | xxxx | | | |
|---|---|---|---|---|
| RESOLUTION | ⦿ 100 dpi | ○ 200 dpi ~49 | ○ 300 dpi | ○ 400 dpi | ○ 600 dpi |
| TYPE OF ORIGINAL | TEXT ▶ | | | |
| FILE FORMAT | BINARY: PDF_Single ▶ | | | |
| | MULTIPLE-VALUE: ▶ | | | |
| ORIENTATION OF ORIGINAL | ⦿ PORTRAIT | ○ LANDSCAPE | | |
| SIDE(S) OF ORIGINAL TO BE SCANNED | ⦿ ONE SIDE | ○ BOTH SIDES | | |
| IMAGE DENSITY | ☑ AUTOMATIC DENSITY | 1 ▶ | | |
| SCANNING MODE | ⦿ ADF/ EXPOSURE GLASS | ○ MASS-SCANNING | ○ SADF | |

IMAGE FORMING APPARATUS, OPERATION-SCREEN CHANGING METHOD, AND COMPUTER-READABLE RECORDING MEDIUM

CROSS-REFERENCE TO RELATED APPLICATIONS

The present application claims priority to and incorporates by reference the entire contents of Japanese priority document 2008-68203 filed in Japan on Mar. 17, 2008 and Japanese priority document 2008-168559 filed in Japan on Jun. 27, 2008.

BACKGROUND OF THE INVENTION

1. Field of the Invention

The present invention relates to an image forming apparatus, an operation-screen changing method, and a computer-readable recording medium.

2. Description of the Related Art

Multi function peripherals (MFPs) including various functions, such as a scan function, a print function, a facsimile (FAX) function, and a data-distribution function have become popular. When a user causes the MFP to execute a predetermined process, the user needs to select a required function from these functions each time to set the function.

To cope with such a cumbersome operation, for example, in a distribution system for scan image data disclosed in Japanese Patent Application Laid-open No. 2003-32425, when a user inserts a prepaid card into scanner equipment installed at a convenience store or the like, the user is directed to input a identification (ID) and a password that have been registered in advance. If the user furnishes an authentic ID and password, the user is permitted to use the scanner equipment. Image data on an original scanned by the scanner equipment is transmitted to a remote server.

However, in the technology disclosed in Japanese Patent Application Laid-open No. 2003-32425, although a series of operations as described above can be executed, when a workflow of a limited application is to be executed, a user still needs to set details depending on the application each time. For example, when an original such as a contract is to be scanned, a user needs to set the resolution higher. Therefore, there has been expected to reduce a work burden on a user.

SUMMARY OF THE INVENTION

It is an object of the present invention to at least partially solve the problems in the conventional technology.

According to an aspect of the present invention, there is provided an image forming apparatus that is connected to a client device via a network. The image forming apparatus includes a storage unit that stores therein a plurality of sets of flow definition data and screen definition data in associated manner, the flow definition data defining a flow of at least one process to be executed by the image forming apparatus, the screen definition data defining an operation screen to be displayed on an operation panel of the image forming apparatus depending on the process; a selection receiving unit that receives a selection of a set of the flow definition data among the sets of the flow definition data stored in the storage unit from the client device; an acquiring unit that acquires screen definition data corresponding to a process defined by the flow definition data received by the selection receiving unit from the storage unit; an editing-screen creating unit that creates an editing screen for editing the operation screen based on the screen definition data acquired by the acquiring unit; a transmitting unit that transmits the editing screen created to the client device; an operation receiving unit that receives a predetermined operation with respect to a component of the editing screen from the client device; a screen-definition-data creating unit that creates screen definition data based on changed editing screen in accordance with the predetermined operation received by the operation receiving unit; and a storing control unit that stores the screen definition data created by the screen-definition-data creating unit in the storage unit so as to be associated with the flow definition data which selection is received by the selection receiving unit.

According to another aspect of the present invention, there is provided an operation-screen changing method that is implemented on an image forming apparatus that is connected to a client device via a network. The operation-screen changing method includes storing in a storage unit a plurality of sets of flow definition data and screen definition data in associated manner, the flow definition data defining a flow of at least one process to be executed by the image forming apparatus, the screen definition data defining an operation screen to be displayed on an operation panel of the image forming apparatus depending on the process; receiving a selection of a set of the flow definition data among the sets of the flow definition data stored in the storage unit from the client device; acquiring screen definition data corresponding to a process defined by the flow definition data received at the receiving a selection from the storage unit; creating an editing screen for editing the operation screen based on the screen definition data acquired at the acquiring; transmitting the editing screen created to the client device; receiving a predetermined operation with respect to a component of the editing screen from the client device; creating screen definition data based on changed editing screen in accordance with the predetermined operation received at the receiving a predetermined operation; and causing the storage unit to store the screen definition data created at the creating unit so as to be associated with the flow definition data which selection is received at the receiving a selection.

According to another aspect of the present invention, there is provided a computer-readable recording medium that stores therein a computer program which when executed on a computer causes the computer to execute the above operation-screen changing method on an image forming apparatus that is connected to a client device via a network.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram of a configuration example of an operation-screen creating system according to an embodiment of the present invention;

FIG. 2 is a block diagram of a server shown in FIG. 1;

FIG. 3 is an explanatory diagram of an example of association information stored in an association-information storage unit shown in FIG. 2;

FIG. 4 is an explanatory diagram of another example of the association information in a table form;

FIG. 5 is a block diagram of a client shown in FIG. 1;

FIG. 6 is a flowchart of editing-screen display processing performed by the server and the client;

FIG. 7 is an explanatory diagram of an example of screen definition data;

FIG. 8 is an explanatory diagram of an example of an editing screen;

FIG. 10 is a flowchart of an operation-screen display processing performed by the server, the client, and the MFP;

FIG. 11 is an explanatory diagram of an example of screen definition data for explaining data on operation selection buttons included therein;

FIG. 15 is an explanatory diagram of an example of screen definition data created in accordance with the editing screen shown in FIG. 14;

FIG. 18 is an explanatory diagram of an example of screen definition data created in accordance with the editing screen shown in FIG. 17;

FIG. 21 is an explanatory diagram of an example of the editing screen after a component is migrated;

FIG. 24 is an explanatory diagram of an example of the editing screen after the component is migrated from a display area to a non-display area;

FIG. 25 is an explanatory diagram of an example of created screen definition data;

FIG. 26 is an explanatory diagram of another example of the editing screen shown in FIG. 24;

FIG. 28 is an explanatory diagram of an example of the editing screen after a preparameter value of the component displayed on the non-display area is set up;

FIG. 29 is an explanatory diagram of an example of the editing screen after the preparameter value of the component displayed on a half-bright display area is set up;

FIG. 33 is an explanatory diagram of an example of created screen definition data;

FIG. 34 is an explanatory diagram of an example of an operation screen corresponding to the screen definition data shown in FIG. 33;

FIG. 36 is an explanatory diagram of an example of the editing screen after the component is migrated from the display area to the half-bright display area;

FIG. 41 is an explanatory diagram of an example of created screen definition data;

FIG. 42 is an explanatory diagram of an example of an operation screen corresponding to the screen definition data shown in FIG. 41.

DETAILED DESCRIPTION OF THE PREFERRED EMBODIMENTS

Figure 9:
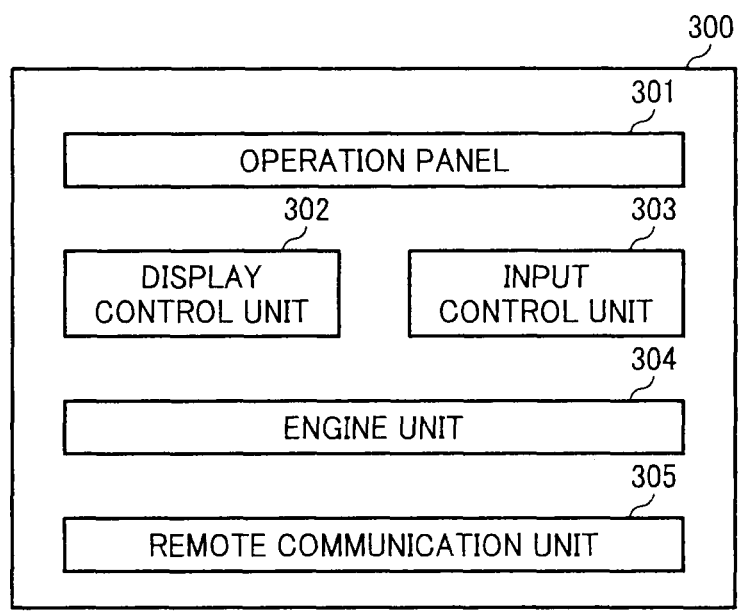
FIG. 9 is a block diagram of an MFP shown in FIG. 1.

Exemplary embodiments of the present invention are explained in detail below with reference to the accompanying drawings. However, the present invention is not limited to the embodiments.

First, there is explained a configuration example of an operation-screen creating system 10 including an information processing apparatus (a server) according to an embodiment of the present invention. FIG. 1 is a block diagram of the operation-screen creating system 10.

The operation-screen creating system 10 includes a server 100, clients 200-1, 200-2, ..., and 200-n, and an MFP 300. An arbitrary one of the clients 200-1, 200-2, ..., and 200-n will be referred to as a client 200. The server 100, the clients 200-1, 200-2, ..., and 200-n, and the MFP 300 are connected to one another via a network 400 such as a local area network (LAN).

FIG. 2 is a block diagram of the server 100. The server 100 includes a remote communication unit 101, a flow-execution control unit 102, a processing unit 103, an editing-screen creating unit 104, a display control unit 105, an input control unit 106, a display unit 107, an operation unit 108, a flow-definition-data creating unit 109, a screen-definition-data creating unit 110, a flow-definition-data storage unit 111, a screen-definition-data storage unit 112, and an association-information storage unit 113. Incidentally, the server 100 is a Web server with respect to the client 200 as a Web client.

The flow-definition-data storage unit 111 stores therein flow definition data and a flow ID for identifying the flow definition data in an associated manner. The flow definition data is data defining a flow of a process to be performed on image data input to the MFP 300.

The screen-definition-data storage unit 112 stores therein screen definition data and a screen ID for identifying the screen definition data in an associated manner. The screen definition data is data for creating an operation screen to be displayed on an operation panel of the MFP 300 upon execution of the process defined by the flow definition data. The screen definition data is written in Extensible Markup Language (XML). For example, when the flow definition data defines a process of scanning an original with a scan function, XML data for creating a scan setting screen is stored as the screen definition data.

The association-information storage unit 113 stores therein information on an association between flow definition data and screen definition data (hereinafter, "association information"). FIG. 3 is an explanatory diagram of an example of association information stored in the association-information storage unit 113. As shown in FIG. 3, a flow ID (see a reference numeral 31) is written on a tag for identifying flow definition data, and a screen ID (see a reference numeral 32) is written on a tag for identifying screen definition data, whereby the flow ID is associated with the screen ID. Incidentally, when flow definition data defines a plurality of processes, i.e., a plurality of operation screens is to be displayed, a plurality of screen IDs is associated with one flow ID.

Alternatively, the association-information storage unit 113 can store therein association information in a table form. FIG. 4 is an explanatory diagram of an example of an association information table stored in the association-information storage unit 113. The association information table includes a flow ID and a screen ID in an associated manner. Incidentally, when flow definition data defines a plurality of processes, i.e., a plurality of operation screens is to be displayed, a plurality of screen IDs is associated with one flow ID in the association information table in the same manner as that is written in XML.

The remote communication unit 101 transmits an editing screen as an emulator to the client 200, and receives the editing screen changed by a user of the client 200 from the client 200. Furthermore, the remote communication unit 101 transmits/receives data upon execution of a process. Moreover, the remote communication unit 101 transmits screen definition data to the MFP 300.

The flow-execution control unit 102 reads out flow definition data corresponding to a flow selected on the MFP 300 from the flow-definition-data storage unit 111, and controls the processing unit 103 to execute a process defined by the flow definition data.

The processing unit 103 executes the process defined by the flow definition data. The processing unit 103 includes an image processing unit (not shown) and a distribution processing unit (not shown). The image processing unit performs image processing, such as a conversion of image data. The distribution processing unit distributes the image data to a file server, an Enterprise Document Management Server (EDMS), a Simple Mail Transfer Protocol (SMTP) server, the MFP 300, or the like. Alternatively, the server 100 can be configured to transmit flow definition data and screen definition data to the MFP 300 so that a flow-execution control unit (not shown) and a processing unit (not shown) of the MFP 300 can execute processes instead of the flow-execution control unit 102 and the processing unit 103 of the server 100.

The editing-screen creating unit 104 creates an operation screen for editing (hereinafter, "an editing screen") based on screen definition data corresponding to a flow ID selected on the client 200. The editing screen is about the same as the operation screen except that the editing screen is divided into a display area, a non-display area, a half-bright display area, and the like. Each of components of the operation screen can be selectively migrated to any of the above areas on the editing screen. When a component is migrated from one area to another area on the editing screen, an attribute of the component are changed. Furthermore, when a component is migrated within the display area on the editing screen, a layout of the component on the operation screen is changed.

Furthermore, the editing-screen creating unit 104 creates an attribute setting menu for setting an attribute with respect to an entire component or each item of the component. The term "component" means an element constituting the operation screen. Specifically, the term "component" means a setting item and settable values of the setting item. For example, the scan setting screen has a component composed of "RESOLUTION" as a setting item and "100 dots per inch (dpi)", "200 dpi", "300 dpi", and the like as settable values of the resolution. The term "item" means an individual element constituting a setting item, for example, the settable value of "200 dpi" in the above example.

Moreover, the term "attribute" means a property of an entire component or each item of the component. Specifically, the term "attribute" means a display attribute or a select attribute. The display attribute is an attribute indicating whether to display an entire component or each item of the component on the operation screen. As a value of the display attribute, "display" and "non-display" are settable values. The select attribute is an attribute indicating whether an entire component or each item of the component can be selected. As a value of the select attribute, "selectable" (on the normal display) and "not selectable" (on the half-bright display) are settable values.

The display control unit 105 controls each display data to be displayed on the display unit 107. The input control unit 106 receives an operation input via the operation unit 108, and controls the input. The display unit 107 is specifically a display device, such as a monitor screen. The operation unit 108 is specifically an input device, such as a keyboard or a mouse.

The flow-definition-data creating unit 109 creates or edits flow definition data upon receiving an instruction input to the operation unit 108. The flow-definition-data creating unit 109 stores the created or edited flow definition data in the flow-definition-data storage unit 111.

The screen-definition-data creating unit 110 creates or edits screen definition data in accordance with the operation that is received by an input control unit 203 of the client 200 and received via the remote communication unit 101. The screen-definition-data creating unit 110 stores the created or edited screen definition data in the screen-definition-data storage unit 112.

FIG. 5 is a block diagram of the client 200. The client 200 includes a remote communication unit 201, a display control unit 202, the input control unit 203, and a Web browser 204. Incidentally, the client 200 is a Web client with respect to the server 100 as a Web server. The client 200 includes a function capable of executing a Web application transmitted from the server 100 on the Web browser 204.

The remote communication unit 201 transmits/receives data to/from the server 100 via the network 400. The display control unit 202 controls the display of input data received by the input control unit 203 or display data received from the server 100 via the remote communication unit 201. The input control unit 203 receives an input by a user, and requests for a process to the server 100 via the remote communication unit 201.

The Web browser 204 is an application for browsing a Web page written in XML or HyperText Markup Language (HTML). As the Web browser 204, any browser, such as Internet Explorer® or Netscape®, can be used.

The MFP 300 includes a copy function, a FAX function, a print function, a scan function, a function of distributing an input image, and the like. The input image can be an image of an original obtained by the scan function or an image input by the print function or the FAX function. When the MFP 300 executes a workflow selected by a user, the MFP 300 receives screen definition data corresponding to the specified workflow from the server 100, and displays an operation screen based on the received screen definition data thereon. The MFP 300 receives a selection of a parameter value of a setting item displayed on the operation screen from the user, and executes a process corresponding to that parameter value. The configuration of the MFP 300 will be described in detail later.

Incidentally, although the MFP 300 is employed in the present embodiment, any apparatus, such as a copier, a FAX machine, or a printer, can be used instead of the MFP 300 as long as the apparatus can execute a flow distributed from the server 100.

Subsequently, editing-screen display processing performed by the operation-screen creating system 10 is explained below. FIG. 6 is a flowchart of the editing-screen display processing performed by the server 100 and the client 200.

First, the remote communication unit 201 of the client 200 transmits a request for a flow selection screen to the server 100 (Step S601). Upon receiving the request from the client 200, the remote communication unit 101 of the server 100 creates a flow selection screen in accordance with the request based on flow definition data stored in the flow-definition-data storage unit 111, and transmits the created flow selection screen to the client 200 (Step S602). Upon receiving the flow selection screen from the server 100, the input control unit 203 of the client 200 receives a selection of a flow through the flow selection screen (Step S603). The remote communication unit 201 transmits a flow ID corresponding to the selected flow to the server 100 (Step S604).

Upon receiving the flow ID from the client 200, the editing-screen creating unit 104 of the server 100 acquires a screen ID associated with the received flow ID from the association-information storage unit 113 (Step S605). The editing-screen creating unit 104 acquires screen definition data corresponding to the acquired screen ID from the screen-definition-data storage unit 112 (Step S606). FIG. 7 is an explanatory diagram of an example of the screen definition data. The editing-screen creating unit 104 creates an editing screen based on the acquired screen definition data (Step S607). Incidentally, the editing screen can be written in XML. The remote communication unit 101 transmits the created editing screen to the client 200 (Step S608).

In the client 200, when the remote communication unit 201 receives the editing screen, the display control unit 202 displays the editing screen on the Web browser 204 (Step S609). FIG. 8 is an explanatory diagram of an example of the editing screen displayed on the Web browser 204.

In this manner, an operation screen displayed on the MFP 300 for executing a workflow can be edited on the screen of the client 200, so that the operation screen can be easily changed depending on the workflow. Incidentally, there is explained in the above processing that the client 200 transmits a flow ID to the server 100, and receives an editing screen corresponding to the flow ID from the server 100, and then displays the received editing screen thereon. After the processing, screen definition data on the operation screen edited through the editing screen is transmitted to the MFP 300 so as to display the changed operation screen on the operation panel of the MFP 300. It can be said that the operation screen edited by the client 200 is reflected in the MFP 300 only after the edited operation screen is displayed on the operation panel of the MFP 300. A process for reflecting the edited operation screen in the MFP 300 is explained below. First, the configuration of the MFP 300 is explained in detail below.

FIG. 9 is a block diagram of the MFP 300. The MFP 300 includes an operation panel 301, a display control unit 302, an input control unit 303, an engine unit 304, and a remote communication unit 305.

The operation panel 301 includes a display device, such as a liquid crystal display (LCD) device. When the remote communication unit 305 receives screen definition data from the server 100, an operation screen is displayed on the operation panel 301. The operation panel 301 receives an instruction for execution of an application or the like displayed on the operation screen and a selection or a specification of a parameter value of a setting item for executing the instructed application or the like.

The display control unit 302 displays the operation screen on the operation panel 301 in accordance with the screen definition data that the remote communication unit 305 receives from the server 100.

The input control unit 303 receives the instruction for execution of the application or the like and the selected or specified parameter value of the setting item that are input to the operation panel 301 from the operation panel 301, and outputs the received instruction and parameter value to the engine unit 304.

The engine unit 304 includes devices for realizing each of the functions included in the MFP 300, such as the copy function, the FAX function, the print function, and the scan function. For example, the engine unit 304 includes an exposure device, a photosensitive drum, and a transfer belt. The engine unit 304 executes a process required for image formation, such as a copy process or a printing process, in accordance with the parameter value selected or specified via the operation panel 301.

The remote communication unit 305 receives screen definition data from the server 100, and outputs the received screen definition data to the display control unit 302. Furthermore, for example, when receiving an instruction for transmission of image data from the display control unit 302, the remote communication unit 305 transmits the image data to the server 100 in accordance with the instruction. Subsequently, there is explained below operation-screen display processing for displaying the editing screen edited by the client 200 on the operation panel 301 of the MFP 300 as an operation screen.

FIG. 10 is a flowchart of the operation-screen display processing performed by the server 100, the client 200, and the MFP 300 in the operation-screen creating system 10. Incidentally, in this processing, Steps S1001 to S1009 are identical to Steps S601 to S609 in FIG. 6; therefore, the description of Steps S1001 to S1009 is omitted.

When receiving the editing screen from the server 100, the client 200 displays the received editing screen thereon (Step S1009). After that, when the client 200 receives a user's confirmation of contents of the editing screen (Step S1010), the remote communication unit 201 transmits a confirmation notice to the server 100 (Step S1011).

Upon receiving the confirmation notice from the client 200, the remote communication unit 101 of the server 100 transmits the screen definition data acquired at Step S1006 to the MFP 300 (Step S1012). When the remote communication unit 305 of the MFP 300 receives the screen definition data from the server 100, the display control unit 302 displays an operation screen on the operation panel 301 in accordance with the received screen definition data (Step S1013). In this manner, the editing screen edited by the client 200 is displayed on the operation panel 301 of the MFP 300 as the operation screen.

Incidentally, the processing shown in FIGS. 6 and 10 is based on the assumption that the operation screen is edited in association with flow definition data defining a flow of processing on image data input to the MFP 300 or a flow ID. Alternatively, for example, a plurality of operations, such as a product development and a quality control, can be sorted into a plurality of groups so that a user can select any one of operations sorted into one group via an operation selection screen. Then, an operation screen can be edited in association with each of the groups or each of the operations.

Figure 12:
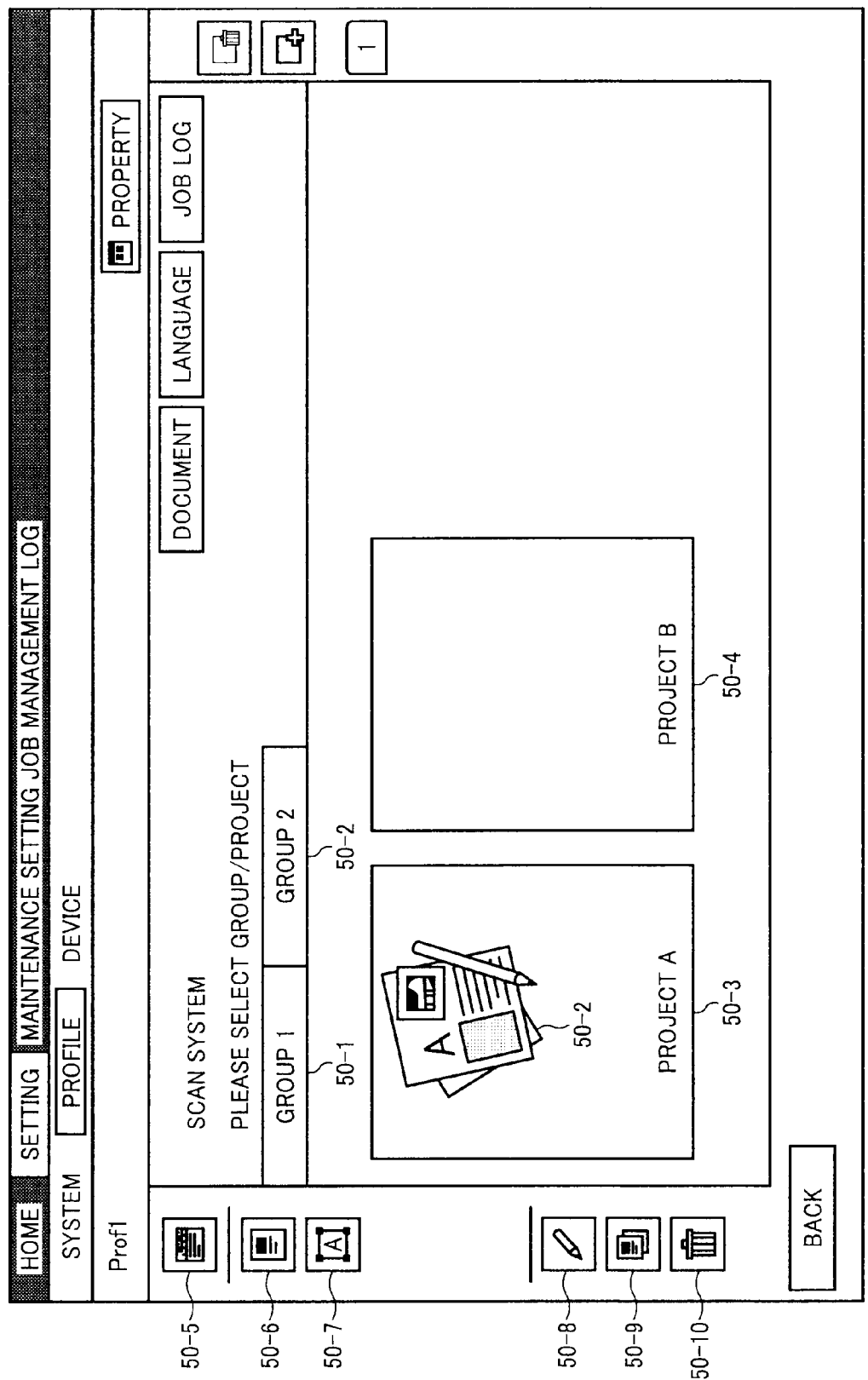
FIG. 12 is an explanatory diagram of an example of the editing screen including the operation selection buttons.

In this case, specifically, at Step S606 or S1006, the editing-screen creating unit 104 acquires screen definition data for selecting an operation from any of the groups as shown in FIG. 11 from the screen-definition-data storage unit 112. Then, at Step S607 or S1007, the editing-screen creating unit 104 creates an operation selection screen as shown in FIG. 12 as an editing screen based on the acquired screen definition data. In this manner, an operation screen by each of the operations as an editing screen can be edited on the client 200. Therefore, even when the MFP is used for a plurality of operations in parallel, a user can conduct the operations efficiently.

Incidentally, in an example shown in FIGS. 11 and 12, processes for two operations of "project A" and "project B" are registered, and the two operations are sorted into "group 1". As for the sorting into groups, a user just selects a tab of a group. For example, when the user selects a tab of "group 2" (see a reference numeral 50-2 in FIG. 12), an operation is sorted into the group 2. Namely, the user can arbitrarily sort each of the operations into any of the groups.

Furthermore, in the example shown in FIGS. 11 and 12, the project A (see a reference numeral 50-3) and the project B (see a reference numeral 50-4) are sorted into the group 1 (see a reference numeral 50-1). The project A and the project B are displayed in the form of a button (hereinafter, "an operation selection button") on the operation selection screen of the group 1. A user can select one operation from a plurality of operations by touching a corresponding operation selection button on the operation panel 301 of the MFP 300.

Such an operation selection button can be created in such a manner that a user click-holds on any of a group creation button 50-5, a project creation button 50-6, and a text creation button 50-7 on the upper left side of the editing screen shown in FIG. 12, and drags and drops it anywhere on the editing screen.

Furthermore, the user can add a comment on the created operation selection button or can change/delete an attribute or a size of the operation selection button in such a manner that the user click-holds on any of a property editing button 50-8, a project copy button 50-9, and a group/project/text delete button 50-10 on the lower left side of the editing screen shown in FIG. 12, and drags and drops it anywhere on the editing screen. Subsequently, a concrete example of various operations for the created operation selection button is explained below.

Figure 13:
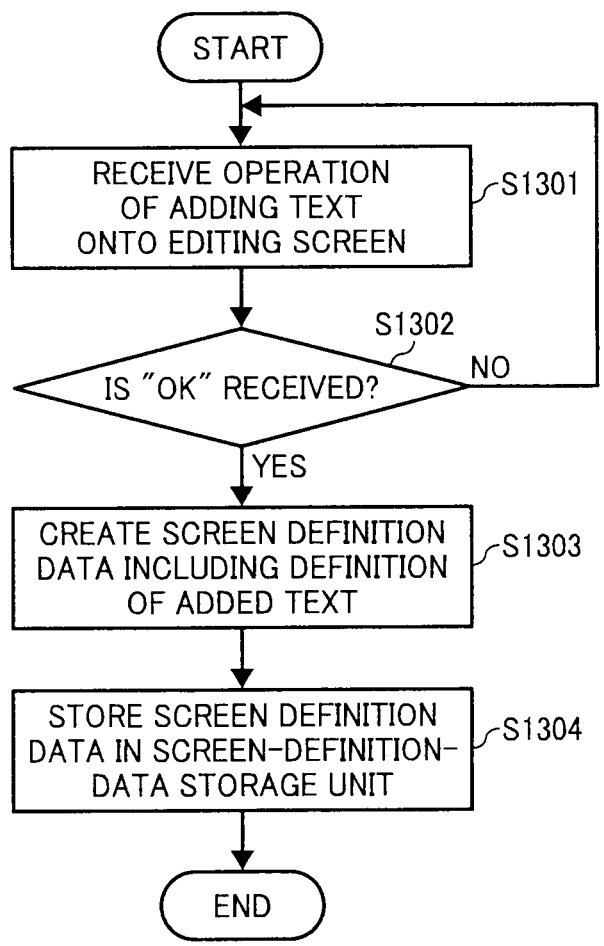
FIG. 13 is a flowchart of a process for adding a text to the operation selection button performed by the server and the client.

FIG. 13 is a flowchart of a text adding process for adding a comment to the operation selection button performed by the server 100 and the client 200 in the operation-screen creating system 10. Incidentally, in the flowchart, the description of data transmission between the server 100 and the client 200 is omitted.

Figure 14:
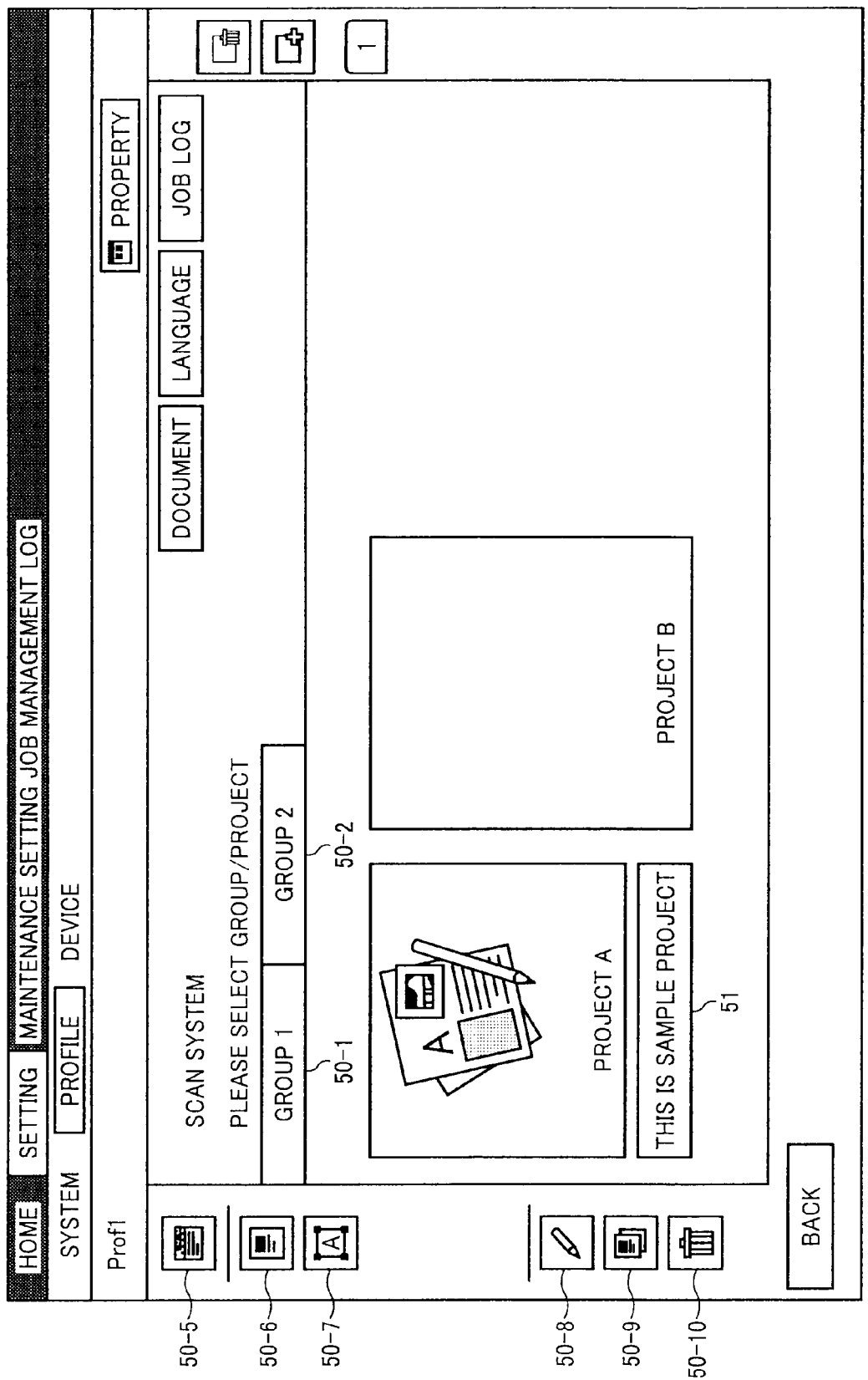
FIG. 14 is an explanatory diagram of an example of the editing screen after a comment is added to the operation selection button.

First, in the client 200, the input control unit 203 receives an operation of adding a text onto the editing screen (Step S1301). FIG. 14 is an explanatory diagram of an example of the editing screen after a text box is added to the operation selection button. The example shown in FIG. 14 is created in such a manner that a user click-holds on the text creation button 50-7 on the upper left side of the editing screen shown in FIG. 12, and drags and drops it at a position 51 on the editing screen shown in FIG. 14.

The input control unit 203 determines whether a user confirms the editing screen, i.e., "OK" is received through the editing screen (Step S1302). When the input control unit 203 determines that "OK" is not received through the editing screen (NO at Step S1302), the process control returns to Step S1301. When the input control unit 203 determines that "OK" is received through the editing screen (YES at Step S1302), the client 200 transmits definition information on the text box added onto the editing screen to the server 100.

Upon receiving the definition information from the client 200, the screen-definition-data creating unit 110 of the server 100 creates screen definition data including the definition of the added text based on the definition information (Step S1303). FIG. 15 is an explanatory diagram of an example of the created screen definition data. As shown in FIG. 15, the definition information on the text box (see the reference numeral 51) is added below the definition of "project A". The screen-definition-data creating unit 110 stores the created screen definition data in the screen-definition-data storage unit 112 (Step S1304). After that, the stored screen definition data is transmitted to the MFP 300, and an operation screen onto which the text box is added is displayed on the operation panel 301 of the MFP 300.

In this manner, a comment on a component of the operation screen, such as the operation selection button, can be written by adding a text onto the editing screen. Therefore, it is possible to create an operation screen enabling a user to recognize an operation selection button sensuously and visually when the user selects an operation.

In the flowchart explained above, there is explained that a comment on an operation selection button is added to make a user recognize the operation selection button easily. As described above, for example, when a number of projects exist, the projects can be sorted into groups, and operation selection buttons of the projects can be registered by each of the groups. Furthermore, a size of each of the operation selection buttons can be changed through the editing screen.

Figure 16:
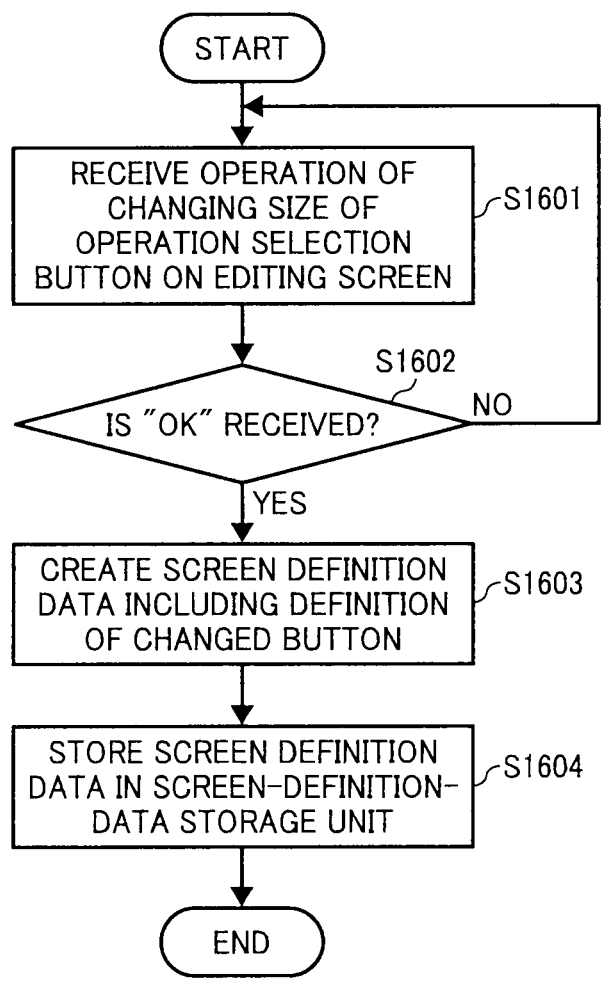
FIG. 16 is a flowchart of a process for changing a size of the operation selection button performed by the server and the client.

FIG. 16 is a flowchart of a size changing process for changing a size of an operation selection button performed by the server 100 and the client 200 in the operation-screen creating system 10. Incidentally, in the flowchart, the description of data transmission between the server 100 and the client 200 is omitted.

Figure 17:
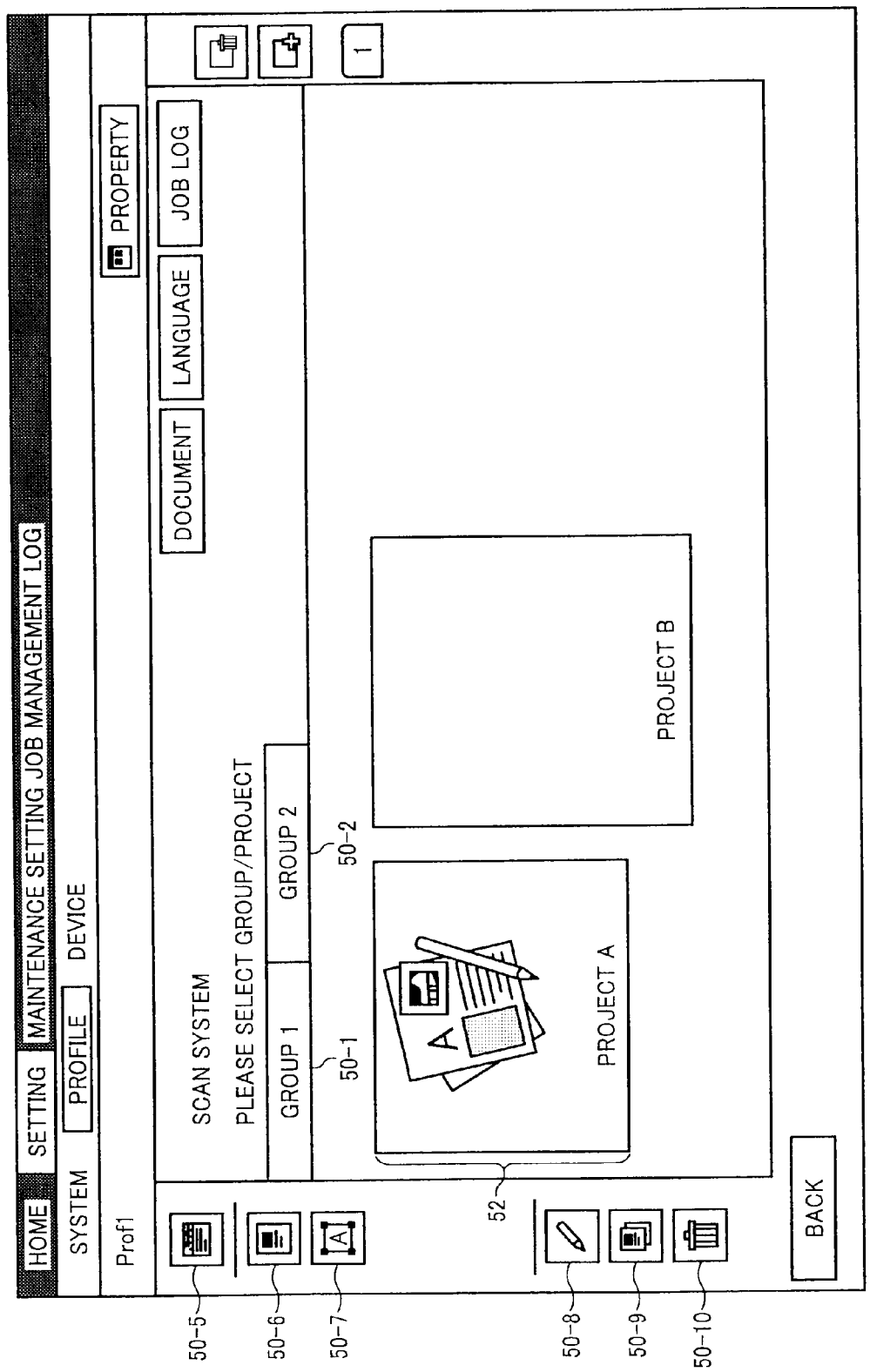
FIG. 17 is an explanatory diagram of an example of the editing screen after the size of the operation selection button is changed.

First, in the client 200, the input control unit 203 receives an operation of changing a size of an operation selection button on the editing screen (Step S1601). FIG. 17 is an explanatory diagram of an example of the editing screen after the size of the operation selection button is changed. In the example shown in FIG. 17, the operation selection button 50-3 of the project A shown in FIG. 12 is reduced in size in a longitudinal direction by being dragged in the longitudinal direction.

The input control unit 203 determines whether a user confirms the editing screen, i.e., "OK" is received through the editing screen (Step S1602). When the input control unit 203 determines that "OK" is not received through the editing screen (NO at Step S1602), the process control returns to Step S1601. When the input control unit 203 determines that "OK" is received through the editing screen (YES at Step S1602), the client 200 transmits definition information on the size of the operation selection button changed through the editing screen to the server 100.

Upon receiving the definition information from the client 200, the screen-definition-data creating unit 110 of the server 100 creates screen definition data including the definition of the operation selection button changed in size based on the definition information (Step S1603). FIG. 18 is an explanatory diagram of an example of the created screen definition data. As shown in FIG. 18, the size of the operation selection button 50-3 in the longitudinal direction is changed from rowspan="4" shown in FIG. 11 to rowspan="3" (see a reference numeral 52 in FIG. 18).

The screen-definition-data creating unit 110 stores the created screen definition data in the screen-definition-data storage unit 112 (Step S1604). After that, the stored screen definition data is transmitted to the MFP 300, and an operation screen in which the size of the operation selection button (52) is changed is displayed on the operation panel 301 of the MFP 300.

In this manner, even when a number of operations are sorted into one group on an operation screen, a size of each of operation selection buttons of the operations can be freely changed on the editing screen. Therefore, it is possible to create the operation screen enabling a user to recognize each of the operation selection buttons sensuously and visually when the user selects an operation.

Figure 19:
FIG. 19 is an explanatory diagram of an example of a property screen for displaying an icon on the operation selection button.

Incidentally, when a user, for example, right-clicks on any of the operation selection buttons shown in FIGS. 12, 14, and 17, a property screen of a project corresponding to the right-clicked operation selection button is displayed as shown in FIG. 19. For example, it is possible to set an icon of the operation selection button through the property screen. By displaying the operation selection buttons in the form of icon, it is possible to create an operation screen enabling a user to more easily recognize each of the operation selection buttons sensuously and visually when the user selects an operation.

Figure 20:
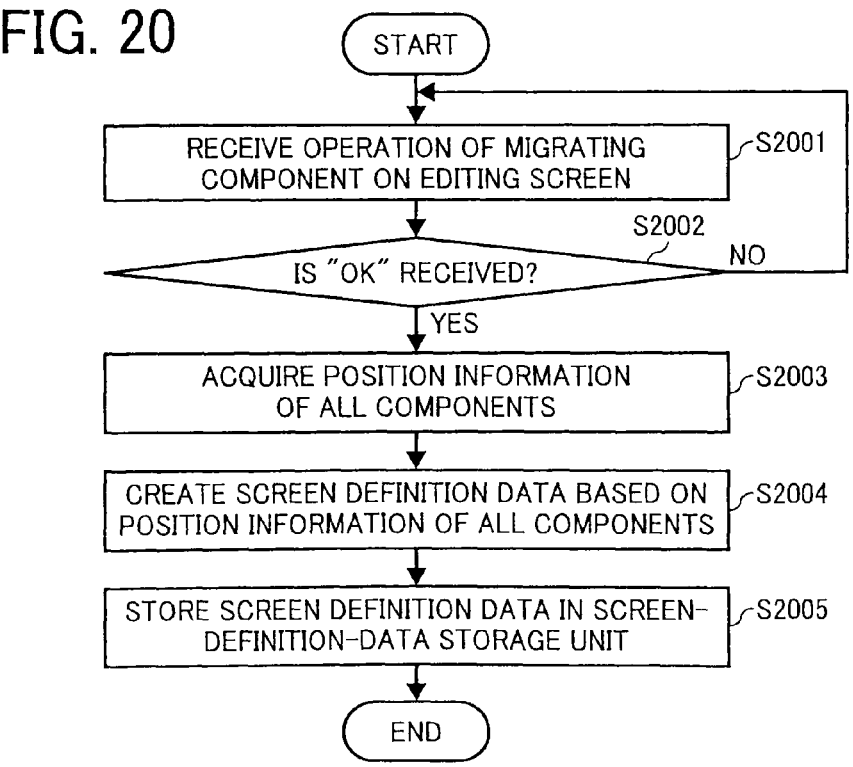
FIG. 20 is a flowchart of a component-position migrating process performed by the server and the client.

Subsequently, a component-position migrating process performed by the operation-screen creating system 10 is explained below. FIG. 20 is a flowchart of the component-position migrating process performed by the server 100 and the client 200. Incidentally, in the flowchart, the description of data transmission between the server 100 and the client 200 is omitted.

First, in the client 200, the input control unit 203 receives an operation of migrating a component on the editing screen (Step S2001). FIG. 21 is an explanatory diagram of an example of the editing screen after the component is migrated. In the example shown in FIG. 21, the component "RESOLUTION" shown in FIG. 8 is dragged and dropped at a position 33 on the editing screen shown in FIG. 21. Incidentally, when a component is migrated on the editing screen, the entire component is subject to the migration.

The input control unit 203 determines whether a user confirms the editing screen, i.e., "OK" is received through the editing screen (Step S2002). When the input control unit 203 determines that "OK" is not received through the editing screen (NO at Step S2002), the process control returns to Step S2001. When the input control unit 203 determines that "OK" is received through the editing screen (YES at Step S2002), the display control unit 202 acquires position information of all the components displayed on the editing screen (Step S2003).

Figures 22, 23:
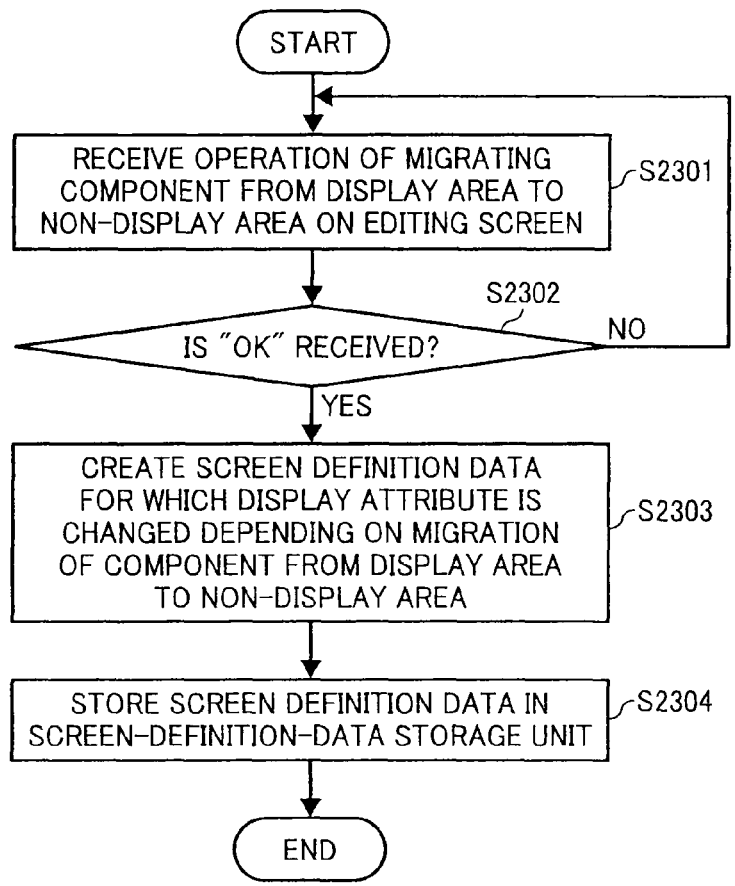
FIG. 22 is an explanatory diagram of an example of created screen definition data.
FIG. 23 is a flowchart of a component non-display setting process performed by the server and the client.

In the server 100, the screen-definition-data creating unit 110 creates screen definition data based on the position information of all the components (Step S2004). FIG. 22 is an explanatory diagram of an example of the created screen definition data. As shown in FIG. 22, position information of "RESOLUTION" is changed to column="7" row="0", i.e., a display position of the component "RESOLUTION" is changed. The screen-definition-data creating unit 110 stores the created screen definition data in the screen-definition-data storage unit 112 (Step S2005). By this process, the display position of the component "RESOLUTION" is changed on the operation screen displayed when a workflow is selected to be executed.

In this manner, a display position of a component on the operation screen can be changed by migration of the component on the editing screen. Therefore, it is possible to create an operation screen depending on a workflow with a simple operation while a user confirms the operation screen sensuously and visually.

Subsequently, a component non-display setting process performed by the operation-screen creating system 10 is explained below. FIG. 23 is a flowchart of the component non-display setting process performed by the server 100 and the client 200.

First, in the client 200, the input control unit 203 receives an operation of migrating a component from the display area to the non-display area on the editing screen (Step S2301). FIG. 24 is an explanatory diagram of an example of the editing screen after the component is migrated from the display area to the non-display area. In the example shown in FIG. 24, the component "RESOLUTION" is dragged and dropped on the non-display area (see a reference numeral 34) on the editing screen.

The input control unit 203 determines whether a user confirms the editing screen, i.e., "OK" is received through the editing screen (Step S2302). When the input control unit 203 determines that "OK" is not received through the editing screen (NO at Step S2302), the process control returns to Step S2301. When the input control unit 203 determines that "OK" is received through the editing screen (YES at Step S2302), information about the migration of the component from the display area to the non-display area on the editing screen is transmitted to the server 100.

In the server 100, the screen-definition-data creating unit 110 creates screen definition data based on the information about the migration of the component from the display area to the non-display area on the editing screen (Step S2303). FIG. 25 is an explanatory diagram of an example of the created screen definition data. As shown in FIG. 25, visible="false" (see a reference numeral 35) is set. As a result, the component "RESOLUTION" is not displayed on the operation screen. The screen-definition-data creating unit 110 stores the created screen definition data in the screen-definition-data storage unit 112 (Step S2304). By this process, the component "RESOLUTION" is not displayed on the operation screen displayed when a workflow is selected to be executed.

On the contrary, the non-display setting of a component can be easily changed to the display setting by migration of the component from the non-display area to the display area on the editing screen.

FIG. 26 is an explanatory diagram of another example of the editing screen shown in FIG. 24. In the example shown in FIG. 26, a drop zone (see a reference numeral 36) is provided instead of the non-display area 34 shown in FIG. 24. For example, when it is not possible to display the whole editing screen including the non-display area due to the limitation of screen size, the display area and the drop zone are displayed, and a component not to be displayed is migrated to the non-display area of the drop zone thereby setting the component not to be displayed. Therefore, it is not necessary to scroll the editing screen, and thus it is possible to improve the operability. Furthermore, when the component in the non-display area of the drop zone is changed to be displayed, the component is migrated to a main area of the drop zone, so that the component is set to be displayed. Incidentally, a position of each of components migrated in the drop zone cannot be specified, and is sequentially arranged in the migrated order.

In this manner, a component can be set to be either displayed or non-displayed on the operation screen by migration of the component to either the display area or the non-display area on the editing screen. Therefore, it is possible to create an operation screen depending on a workflow with a simple operation while a user confirms the operation screen sensuously and visually.

Figure 27:
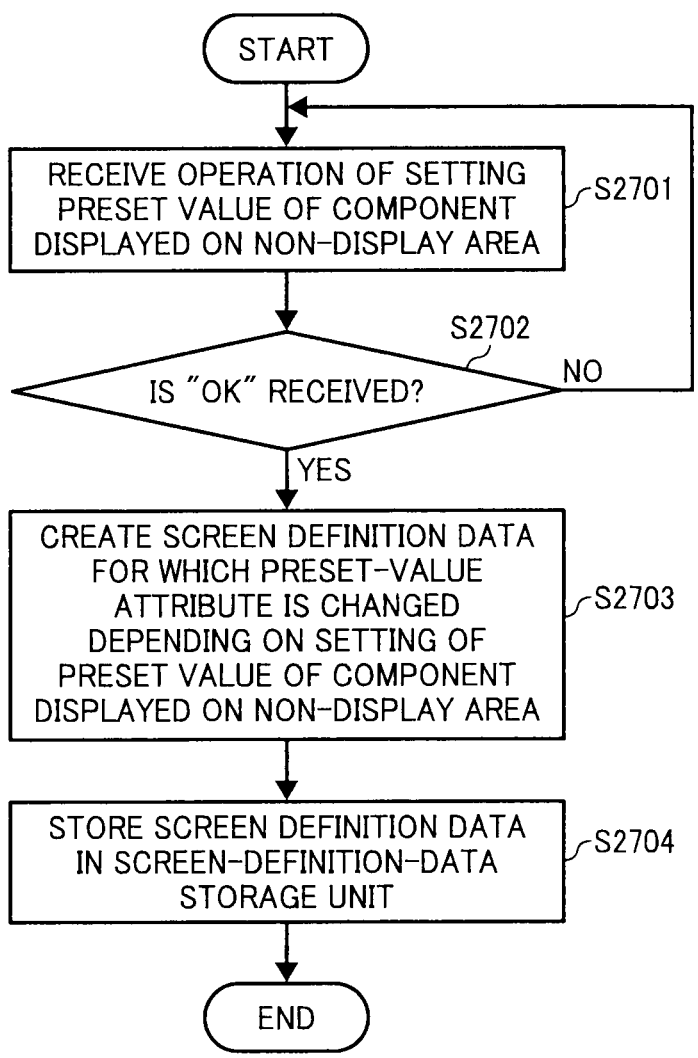
FIG. 27 is a flowchart of a preset-value setting process performed by the server and the client.

Subsequently, a preset-value setting process performed by the operation-screen creating system 10 is explained below. FIG. 27 is a flowchart of the preset-value setting process performed by the server 100 and the client 200.

First, in the client 200, the input control unit 203 receives an operation of setting a preset value of a component displayed on the non-display area of the editing screen (Step S2701). FIG. 28 is an explanatory diagram of an example of the editing screen after the preset value of the component displayed on the non-display area is set up. In the example shown in FIG. 28, the component "RESOLUTION" displayed on the non-display area of the editing screen is set at a preset value of "300 dpi" (see a reference numeral 37).

The input control unit 203 determines whether a user confirms the editing screen, i.e., "OK" is received through the editing screen (Step S2702). When the input control unit 203 determines that "OK" is not received through the editing screen (NO at Step S2702), the process control returns to Step S2701. When the input control unit 203 determines that "OK" is received through the editing screen (YES at Step S2702), set contents, i.e., a setting item and a preset value are transmitted to the server 100.

In the server 100, the screen-definition-data creating unit 110 creates screen definition data for which a preset-value attribute is changed depending on the setting of the preset value of the component displayed on the non-display area (Step S2703). The screen-definition-data creating unit 110 stores the created screen definition data in the screen-definition-data storage unit 112 (Step S2704). By this process, on the operation screen displayed when a workflow is selected to be executed, the component "RESOLUTION" is not displayed thereon, and the resolution is set at "300 dpi".

Incidentally, a preset value of a component displayed on the half-bright display area can be set in the same manner as that is displayed on the non-display area. FIG. 29 is an explanatory diagram of an example of the editing screen after the preset value of the component displayed on the half-bright display area is set up. In the example shown in FIG. 29, the component "RESOLUTION" displayed on the half-bright display area is set at a preset value of "300 dpi" (see a reference numeral 38). By the setting of the preset value, on the operation screen displayed when a workflow is selected to be executed, the component "RESOLUTION" is displayed on the half-bright display, and the resolution is set at "300 dpi". In this case, the component "RESOLUTION" is displayed on the half-bright display on the operation screen, so that a user cannot select a value of the resolution from settable values but can recognize the preset value of the resolution because the setting of "RESOLUTION" at "300 dpi" is displayed on the half-bright display.

Figure 30:
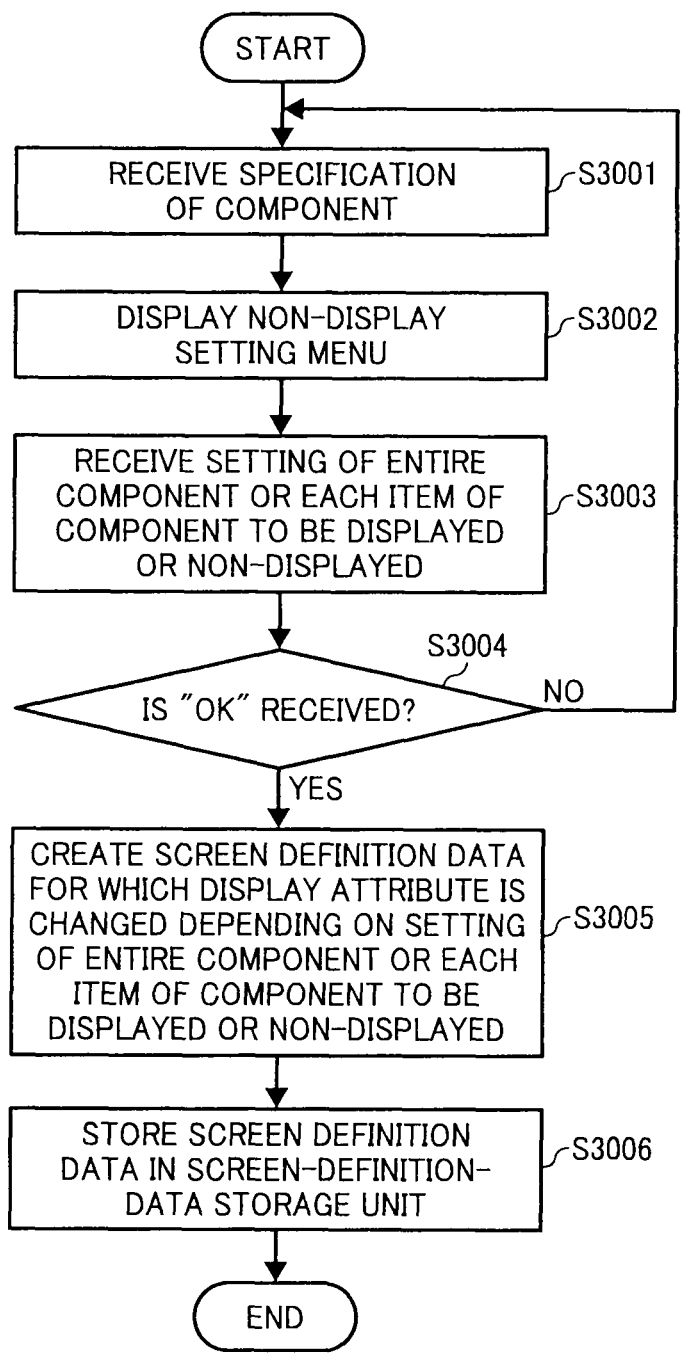
FIG. 30 is a flowchart of a component/item non-display setting process performed by the server and the client.

Subsequently, a non-display setting process performed by the operation-screen creating system 10 is explained below. FIG. 30 is a flowchart of the non-display setting process performed by the server 100 and the client 200. By this process, an entire component or each item of the component can be hidden on the operation screen.

Figure 31:
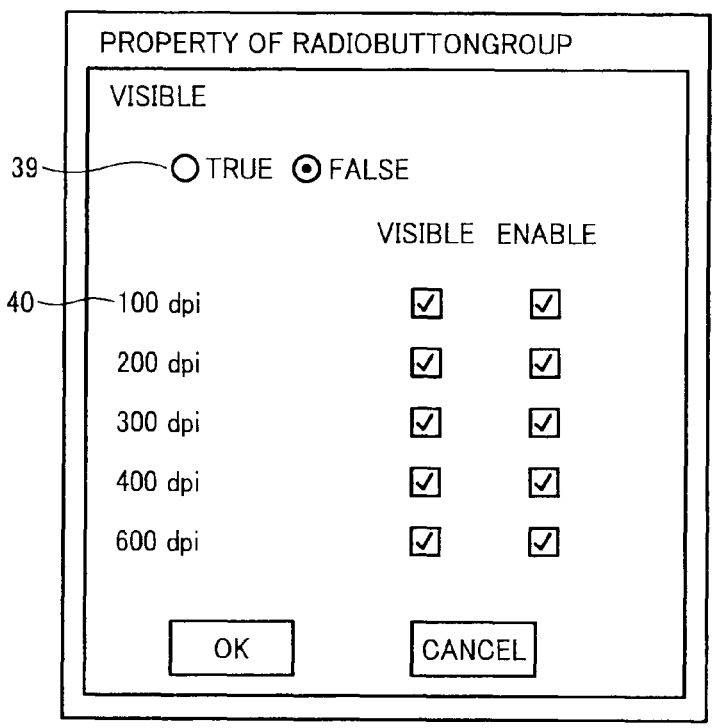
FIG. 31 is an explanatory diagram of an example of a non-display setting menu.

First, in the client 200, the input control unit 203 receives a specification of a component (Step S3001). For example, a user right-clicks on the component thereby specifying the component. The display control unit 202 displays a non-display setting menu (Step S3002). The non-display setting menu is displayed, for example, as a pop-up menu. FIG. 31 is an explanatory diagram of an example of the non-display setting menu. The non-display setting menu shown in FIG. 31 is a menu for setting the entire component "RESOLUTION" to be either displayed or non-displayed (see a reference numeral 39) and also setting each of the settable values of the component "RESOLUTION" to be either displayed or non-displayed (see a reference numeral 40).

Figure 32:
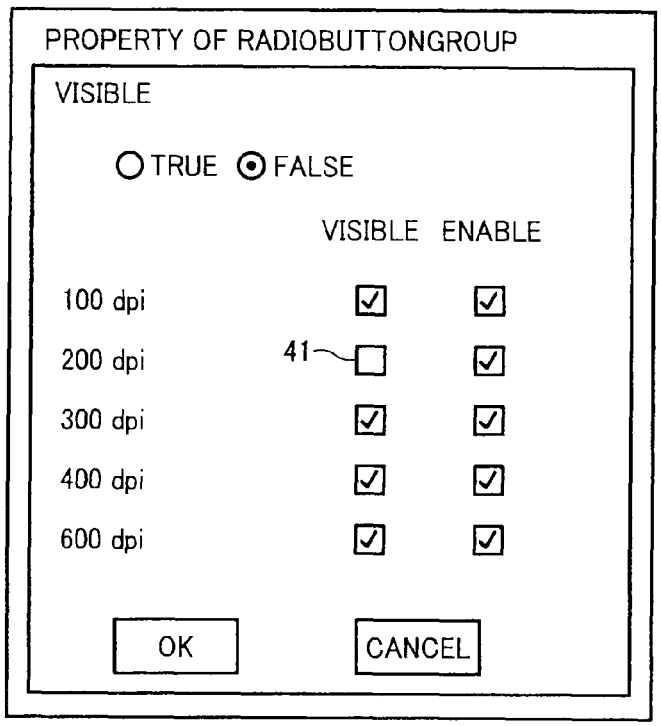
FIG. 32 is an explanatory diagram of another example of the non-display setting menu.

The input control unit 203 receives the setting of the entire component or each item of the component to be displayed or non-displayed through the non-display setting menu (Step S3003). In the example shown in FIG. 31, the entire component "RESOLUTION" is set to "False", so that the entire component "RESOLUTION" is not displayed. Next, the setting of each item of the component "RESOLUTION" is explained below. FIG. 32 is an explanatory diagram of another example of the non-display setting menu. In the example shown in FIG. 32, the box "Visible (i.e., display)" of the item of "200 dpi" is not checked (see a reference numeral 41), so that the item of "200 dpi" is not displayed.

The input control unit 203 determines whether "OK" is received through the non-display setting menu (Step S3004). When the input control unit 203 determines that "OK" is not received through the non-display setting menu, i.e., "CANCEL" is received (NO at Step S3004), the process control returns to Step S3001. When the input control unit 203 determines that "OK" is received through the non-display setting menu (YES at Step S3004), the input to the non-display setting menu is ended.

In the server 100, the screen-definition-data creating unit 110 creates screen definition data for which a display attribute is changed depending on the setting of the entire component or each item of the component to be displayed or non-displayed (Step S3005). FIG. 33 is an explanatory diagram of an example of the created screen definition data. In the screen definition data shown in FIG. 33, depending on the settings shown in FIG. 32, RadioButton id="radio2" is changed to visible="false" (see a reference numeral 42). The screen-definition-data creating unit 110 stores the created screen definition data in the screen-definition-data storage unit 112 (Step S3006). By this process, on the operation screen displayed when a workflow is selected to be executed, a display attribute of the entire component or each item of the component is changed. FIG. 34 is an explanatory diagram of an example of an operation screen corresponding to the screen definition data shown in FIG. 33. In the example shown in FIG. 34, the settable value of "200 dpi" of the component "RESOLUTION" is not displayed in response to the screen definition data (see a reference numeral 43).

Figure 35:
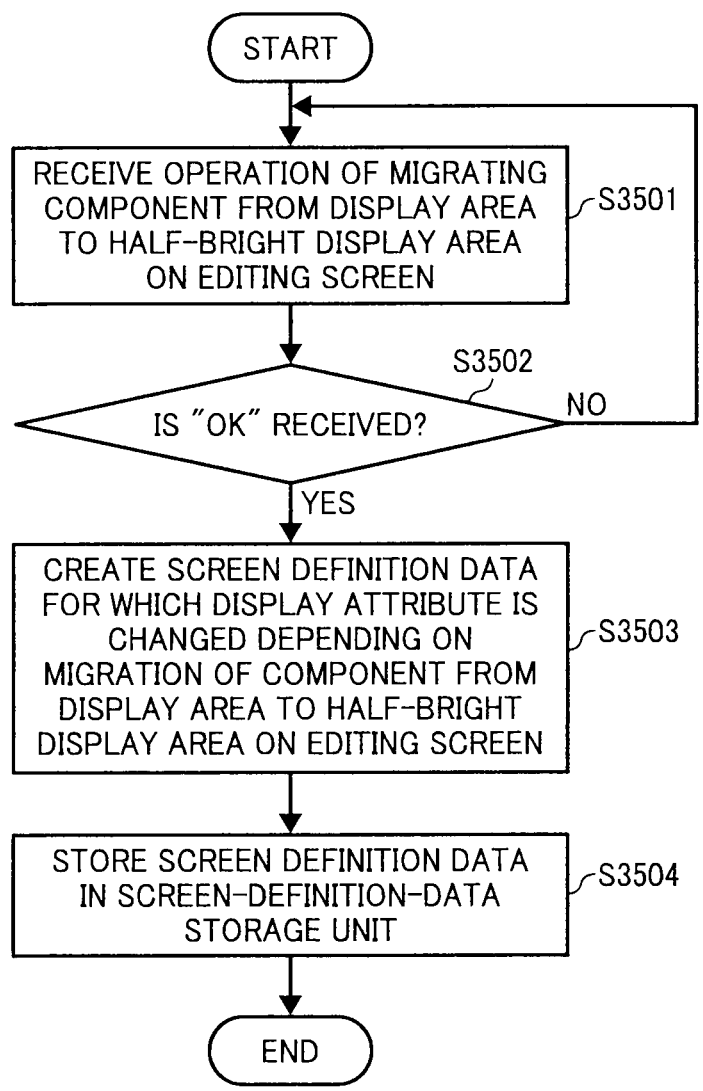
FIG. 35 is a flowchart of a component half-bright-display setting process performed by the server and the client.

Subsequently, a half-bright-display setting process performed by the operation-screen creating system 10 is explained below. FIG. 35 is a flowchart of the half-bright-display setting process performed by the server 100 and the client 200.

First, in the client 200, the input control unit 203 receives an operation of migrating a component from the display area to the half-bright display area on the editing screen (Step S3501). FIG. 36 is an explanatory diagram of an example of the editing screen after the component is migrated from the display area to the half-bright display area. In the example shown in FIG. 36, the component "RESOLUTION" is dragged and dropped on the half-bright display area on the editing screen (see a reference numeral 44).

The input control unit 203 determines whether "OK" is received through the editing screen (Step S3502). When the input control unit 203 determines that "OK" is not received through the editing screen (NO at Step S3502), the process control returns to Step S3501. When the input control unit 203 determines that "OK" is received through the editing screen (YES at Step S3502), information about the migration of the component from the display area to the half-bright display area on the editing screen is transmitted to the server 100.

Figures 37, 38:
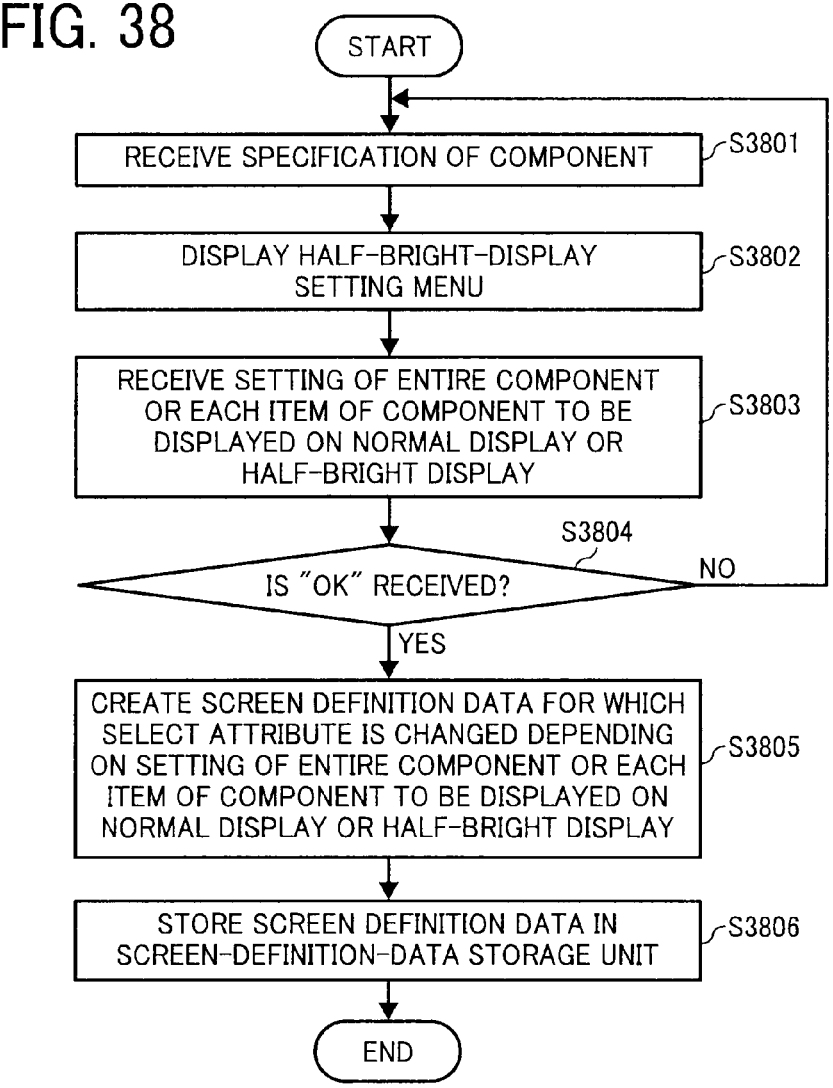
FIG. 37 is an explanatory diagram of an example of created screen definition data.
FIG. 38 is a flowchart of a component/item half-bright-display setting process performed by the server and the client.

In the server 100, the screen-definition-data creating unit 110 creates screen definition data for which a select attribute is changed depending on the migration of the component from the display area to the half-bright display area on the editing screen (Step S3503). FIG. 37 is an explanatory diagram of an example of the created screen definition data. In the screen definition data shown in FIG. 37, enabled="false" is set (see a reference numeral 45). The screen-definition-data creating unit 110 stores the created screen definition data in the screen-definition-data storage unit 112 (Step S3504). By this process, on the operation screen displayed when a workflow is selected to be executed, the component "RESOLUTION" is displayed on the half-bright display. Therefore, the user cannot select a value of the resolution but can recognize the entire component (including a preset value and settable values of the component).

On the contrary, the half-bright display setting of a component can be easily changed to the display setting by migration of the component from the half-bright display area to the display area on the editing screen.

Subsequently, a half-bright-display setting process performed by the operation-screen creating system 10 is explained below. FIG. 38 is a flowchart of the half-bright-display setting process performed by the server 100 and the client 200. By this process, an entire component or each item of the component can be displayed on the half-bright display.

Figure 39:
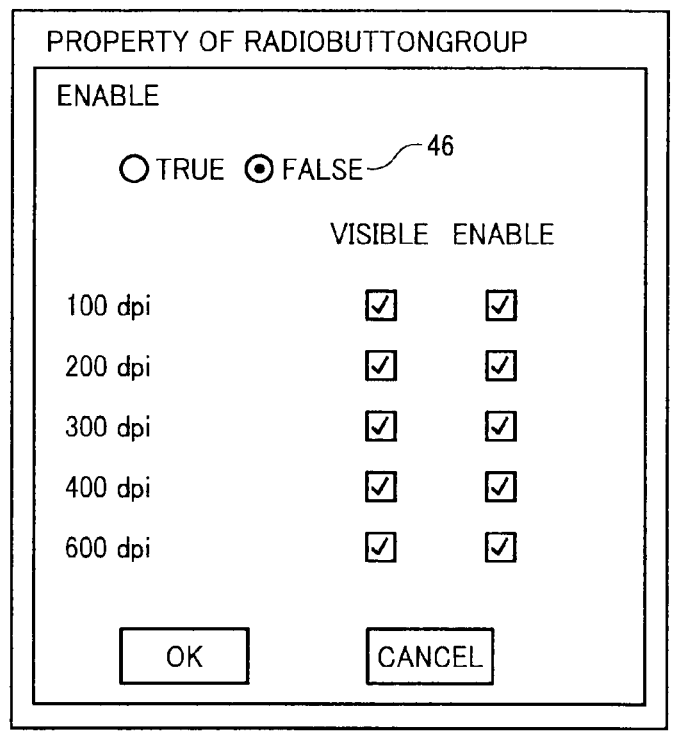
FIG. 39 is an explanatory diagram of an example of a half-bright-display setting menu.

First, in the client 200, the input control unit 203 receives a specification of a component (Step S3801). For example, a user double-clicks on the component thereby specifying the component. The display control unit 202 displays a half-bright-display setting menu (Step S3802). The half-bright-display setting menu is displayed, for example, as a pop-up menu. FIG. 39 is an explanatory diagram of an example of the half-bright-display setting menu. The half-bright-display setting menu shown in FIG. 39 is a menu for setting the display of the entire component "RESOLUTION" to either on the normal display (the selectable display) or on the half-bright display (the non-selectable display) and also setting each of the settable values of the component "RESOLUTION" to be displayed on either the normal display or the non-display or either the normal display or the half-bright display.

Figure 40:
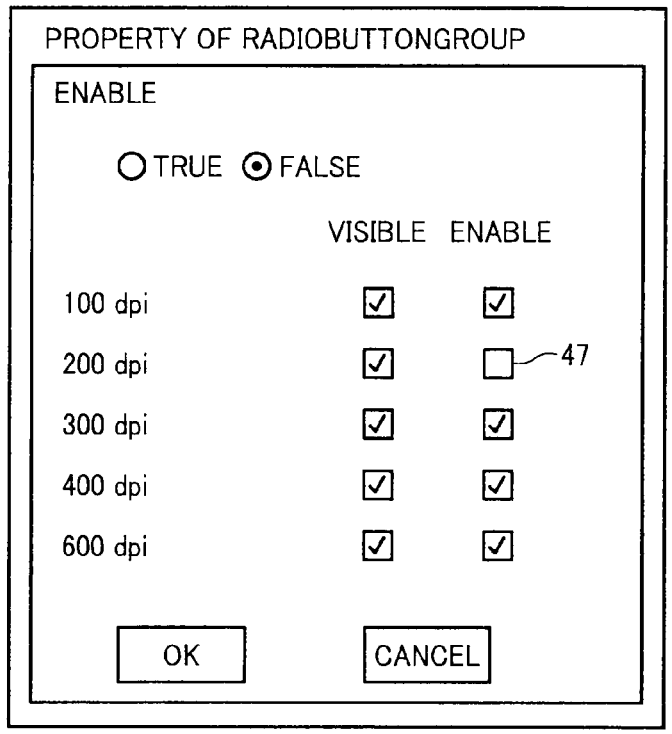
FIG. 40 is an explanatory diagram of another example of the half-bright-display setting menu.

The input control unit 203 receives the setting of the entire component or each item of the component to be displayed on the normal display or the half-bright display through the half-bright-display setting menu (Step S3803). In the example shown in FIG. 39, the entire component "RESOLUTION" is set to "False" (see a reference numeral 46), so that the entire component "RESOLUTION" is displayed on the half-bright display. Next, the setting of each item of the component "RESOLUTION" is explained below. FIG. 40 is an explanatory diagram of another example of the half-bright-display setting menu. In the example shown in FIG. 40, the box "Enable (i.e., selectable)" of the item of "200 dpi" is not checked (see a reference numeral 47), so that the item of "200 dpi" is displayed on the half-bright display.

The input control unit 203 determines whether "OK" is received through the half-bright-display setting menu (Step S3804). When the input control unit 203 determines that "OK" is not received through the half-bright-display setting menu, i.e., "CANCEL" is received (NO at Step S3804), the process control returns to Step S3801. When the input control unit 203 determines that "OK" is received through the half-bright-display setting menu (YES at Step S3804), the input to the half-bright-display setting menu is ended.

In the server 100, the screen-definition-data creating unit 110 creates screen definition data for which a select attribute is changed depending on the setting of the entire component or each item of the component to be displayed on either the normal display or the half-bright display (Step S3805). FIG. 41 is an explanatory diagram of an example of the created screen definition data. In the screen definition data shown in FIG. 41, enable of RadioButton id="radio2" is changed to enable="false" (see a reference numeral 48) depending on the settings shown in FIG. 40. The screen-definition-data creating unit 110 stores the created screen definition data in the screen-definition-data storage unit 112 (Step S3806). By this process, on the operation screen corresponding to the flow, the select attribute of the entire component or each item of the component is changed. FIG. 42 is an explanatory diagram of an example of the operation screen corresponding to the screen definition data shown in FIG. 41. In the example shown in FIG. 42, "200 dpi" of the component "RESOLUTION" is displayed on the half-bright display (see a reference numeral 49) in response to the screen definition data, so that a user cannot select the item "200 dpi".

Figure 43:
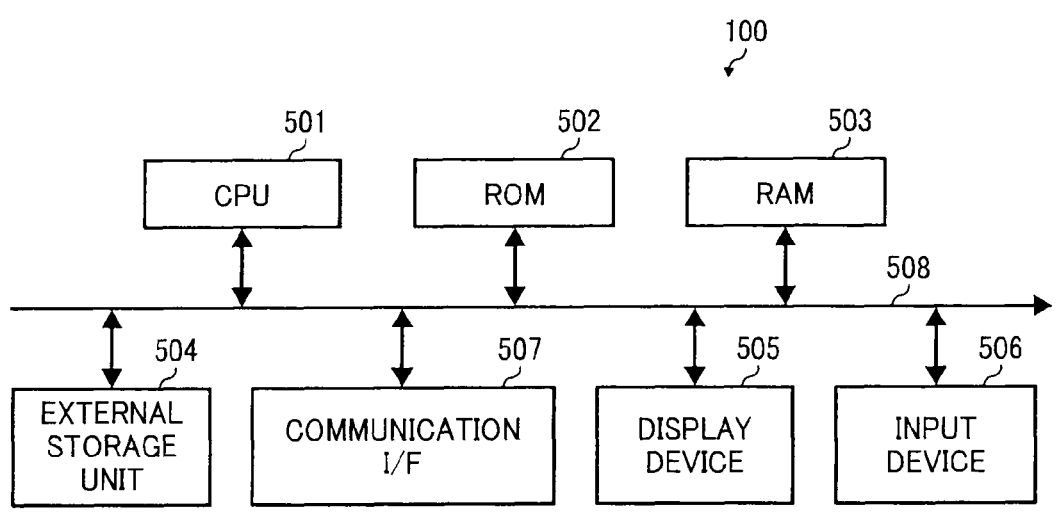
FIG. 43 is a block diagram for explaining a hardware configuration of the server.

FIG. 43 is a block diagram for explaining a hardware configuration of the server 100. The server 100 employs a hardware configuration with the use of a regular computer. The server 100 includes a control unit such as a central processing unit (CPU) 501, a memory unit such as a read-only memory (ROM) 502 and a random access memory (RAM) 503, an external storage unit 504 such as a hard disk drive (HDD) or a compact disk (CD) drive, a display device 505, an input device 506 such as a keyboard or a mouse, a communication interface (I/F) 507 for connecting the server 100 to an external network, and a bus 508. The CPU 501, the ROM 502, the RAM 503, the external storage unit 504, the display device 505, the input device 506, and the communication I/F 507 are connected to one another via the bus 508.

An operation-screen changing program executed by the server 100 is stored in a computer-readable recording medium, such as a CD-ROM, a flexible disk (FD), a CD recordable (CD-R), or a digital versatile disk (DVD), in an installable or executable file format.

Alternatively, the operation-screen changing program can be stored on a computer connected to a network such as the Internet so as to be downloaded via the network. Furthermore, the operation-screen changing program can be provided or distributed via the network.

Moreover, the operation-screen changing program can be preliminarily built into the memory unit, such as the ROM 502, of the server 100.

The operation-screen changing program is composed of modules of the elements included in the server 100 (i.e., the remote communication unit 101, the flow-execution control unit 102, the processing unit 103, the editing-screen creating unit 104, the display control unit 105, the input control unit 106, the display unit 107, the operation unit 108, the flow-definition-data creating unit 109, the screen-definition-data creating unit 110, the flow-definition-data storage unit 111, the screen-definition-data storage unit 112, and the association-information storage unit 113). The CPU 501 as an actual hardware reads out the operation-screen changing program from the recording medium, and executes the operation-screen changing program, whereby the above elements are loaded on the main memory unit, i.e., the remote communication unit 101, the flow-execution control unit 102, the processing unit 103, the editing-screen creating unit 104, the display control unit 105, the input control unit 106, the display unit 107, the operation unit 108, the flow-definition-data creating unit 109, the screen-definition-data creating unit 110, the flow-definition-data storage unit 111, the screen-definition-data storage unit 112, and the association-information storage unit 113 are created on the main memory unit.

Incidentally, as the flow-definition-data storage unit 111, the screen-definition-data storage unit 112, and the association-information storage unit 113, any commonly-used memory media, such as an HDD, an optical disk, and a memory card, can be used.

The client 200 according to the present embodiment employs a hardware configuration with the use of a regular computer. The client 200 includes a control unit such as a CPU, a memory unit such as a ROM or a RAM, an external storage unit such as an HDD or a CD drive, a display device, and an input device such as a keyboard or a mouse.

Furthermore, in the present embodiment, the server 100 and the MFP 300 are separately provided. Alternatively, the MFP 300 can be configured to have the functions and the configuration of the server 100.

According to an aspect of the present invention, an operation screen displayed on an image forming apparatus upon execution of a workflow can be changed by operating an editing screen. Therefore, the operation screen can be easily changed depending on the workflow.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus for connection to an image forming apparatus and a client device via a network, the information processing apparatus comprising:
   a storage unit that stores in advance therein screen definition data defining a screen-content of a work flow including a combination of a plurality of information processings executed in the image forming apparatus;
   a transmitting unit that transmits the screen definition data corresponding to the work flow to the client device in accordance with a selection of the work flow from the client device;
   a receiving unit that receives definition data of a screen content edited by the client device, the screen content being edited by the client device via an editing screen generated by an edit-screen creating unit, the editing screen defining a main display area that is an area for items that are to be displayed and a non-display area that is an area for items that are not to be displayed, the edit-screen creating unit automatically including a non-display drop area instead of the non-display area when screen size is insufficient to display both the main display area and the non-display area on the same screen, and an item displayed on the main display area being configured to be moved onto the non-display drop area via drag and drop operation; and
   a storing control unit that controls storing of the definition data of the screen content edited by the client device in the storage unit.

2. The information processing apparatus according to claim 1, wherein:
   the storage unit stores the definition data of the screen content with a form of structured documents; and
   the storing control unit associates the definition data of the screen content which has been edited by the client device with the screen definition data previously stored in the storage unit, by adding the screen definition data which has been edited by the client device to the screen definition data previously stored in the storage unit with the form of structured documents.

3. The information processing apparatus according to claim 2, wherein:
   the transmitting unit transmits the screen definition data based on the screen definition data associated by the storing control unit and the screen definition data previously stored in the storage unit to the image forming device.

4. The information processing apparatus according to claim 1, wherein:
   the screen definition data stored in the storage unit is formatted as a structured document using tags, and
   the storing control unit adds the definition data of the screen content edited by the client device to the structured document to associate the definition data of the screen content with the screen definition data.

5. The information processing apparatus according to claim 1, wherein:
   the storing control unit is configured to create screen data by combining the screen definition data and the definition data of the screen content, and
   the transmitting unit is configured to transmit the screen data.

6. The information processing apparatus according to claim 1, wherein:
   the editing screen includes a first item that is included on the main display area, a second item that is included on the non-display area, and a third item that is grayed-out and included on the main display area.

7. The information processing apparatus according to claim 6, wherein:
   the storing control unit is configured to create screen data by combining the screen definition data and the definition data of the screen content, the created screen data defining a display area and defining that the first item is displayed on the display area, that the second item is not displayed on the display area, and that the third item is grayed-out and displayed on the display area.

8. An operation-screen changing method implemented using an image processing apparatus which is connected to an image forming apparatus and a client device via a network, comprising:
   storing, in advance, screen definition data defining a screen-content of a work flow including a combination of a plurality of information processings executed in the image forming apparatus;
   transmitting the screen definition data corresponding to the work flow to the client device in accordance with a selection of the work flow from the client device;
   receiving definition data of a screen content edited by the client device, the screen content being edited by the client device via an editing screen generated by an edit-screen creating unit, the editing screen defining a main display area that is an area for items that are to be displayed and a non-display area that is an area for items that are not to be displayed, automatically including, by the edit-screen creating unit, a non-display drop area instead of the non-display area when screen size is insufficient to display both the main display area and the non-display area on the same screen, and an item displayed on the main display area being configured to be moved onto the non-display drop area via drag and drop operation; and
   storing the definition data of the screen content edited by the client device.

9. The method according to claim 8, wherein:
the storing of the definition data of the screen content edited by the client device includes associating the screen definition which has been edited by the client device with the screen definition data previously stored, by adding the screen definition data which has been edited by the client device to the screen definition data previously stored using a form of a structured document.

10. The method according to claim 9, wherein:
the transmitting transmits the screen data based on the screen definition data which has been associated with the screen definition data previously stored to the image forming device.

11. The method according to claim 8, wherein:
the screen definition data which is stored is formatted as a structured document using tags,
the method further comprising:
adding the definition data of the screen content edited by the client device to the structured document to associate the definition data of the screen content with the screen definition data.

12. The method according to claim 8, further comprising:
creating screen data by combining the screen definition data and the definition data of the screen content, and transmitting the screen data.

13. A non-transitory computer-readable recording medium that stores therein a computer program which when executed on a computer causes the computer to execute an operation-screen changing method in an information processing apparatus which is connected to an image forming apparatus and a client device via a network, the computer program causing the computer to execute:
storing, in advance, screen definition data defining a screen-content of a work flow including a combination of a plurality of information processings executed in the image forming apparatus;
transmitting the screen definition data corresponding to the work flow to the client device in accordance with a selection of the work flow from the client device;
receiving definition data of a screen content edited by the client device, the screen content being edited by the client device via an editing screen generated by an edit-screen creating unit, the editing screen defining a main display area that is an area for items that are to be displayed and a non-display area that is an area for items that are not to be displayed, automatically including, by the edit-screen creating unit, a non-display drop area instead of the non-display area when screen size is insufficient to display both the main display area and the non-display area on the same screen, and an item displayed on the main display area being configured to be moved onto the non-display drop area via drag and drop operation; and
storing the definition data of the screen content edited by the client device.

14. The non-transitory computer-readable recording medium according to claim 13, wherein:
the storing of the definition data of the screen content edited by the client device includes associating the screen definition which has been edited by the client device with the screen definition data previously stored, by adding the screen definition data which has been edited by the client device to the screen definition data previously stored using a form of a structured document.

15. The non-transitory computer-readable recording medium according to claim 14, wherein:
the transmitting transmits the screen data based on the screen definition data which has been associated with the screen definition data previously stored to the image forming device.

16. The non-transitory computer-readable recording medium according to claim 13, wherein:
the screen definition data which is stored is formatted as a structured document using tags, and
the computer program, which when executed on the computer, further causes:
adding the definition data of the screen content edited by the client device to the structured document to associate the definition data of the screen content with the screen definition data.

17. The non-transitory computer-readable recording medium according to claim 13, wherein the computer program, which when executed on the computer, further causes:
creating screen data by combining the screen definition data and the definition data of the screen content, and transmitting the screen data.

* * * * *